United States Patent
Nordgren

[15] 3,678,971
[45] July 25, 1972

[54] APPARATUS AND METHOD FOR CAGE ROLLING AND WELDING

[72] Inventor: Alfred A. Nordgren, Holland, Mich.
[73] Assignee: W.E. Dunn Mfg. Co., Holland, Mich.
[22] Filed: July 15, 1970
[21] Appl. No.: 55,071

[52] U.S. Cl. .............................140/107, 140/112, 219/56
[51] Int. Cl. ......................................B21f 15/08, B21f 33/00
[58] Field of Search.....................140/107, 112, 1, 71, 92.1; 219/56, 58; 29/477, 477.7

[56] References Cited

UNITED STATES PATENTS

| | | | |
|---|---|---|---|
| 2,040,349 | 5/1936 | Wagner | 140/112 |
| 2,814,326 | 11/1957 | Washabaugh | 140/107 |
| 3,370,150 | 2/1968 | Nordgren | 140/112 |

*Primary Examiner*—Lowell A. Larson
*Attorney*—Price, Heneveld, Huizenga & Cooper

[57] ABSTRACT

A storage crib is provided for a roll of wire fabric which is fed beneath a shear, to a cage forming assembly which forms the fabric into a concrete pipe reinforcing cage in such a manner that it encircles a boom extending over the forming rollers. When a cage is formed, the boom can be elevated, thus extracting the formed cage from the forming apparatus. The cage is then conveyed down the boom to a welding conveyor by which it is conveyed on a beam past a welding apparatus. The welding apparatus engages and holds a pair of juxtaposed circumferential wires and then travels with the cage as the wires are welded together. Upon completion of the weld, the wires are disengaged and the welding apparatus travels in the opposite direction towards the next pair of juxtaposed circumferential wires. The beam is supported by a plurality of supports which can be disengaged from the beam such that the cage can travel past each support as it travels towards the egress end of the welding apparatus.

56 Claims, 25 Drawing Figures

Patented July 25, 1972
3,678,971
11 Sheets-Sheet 1
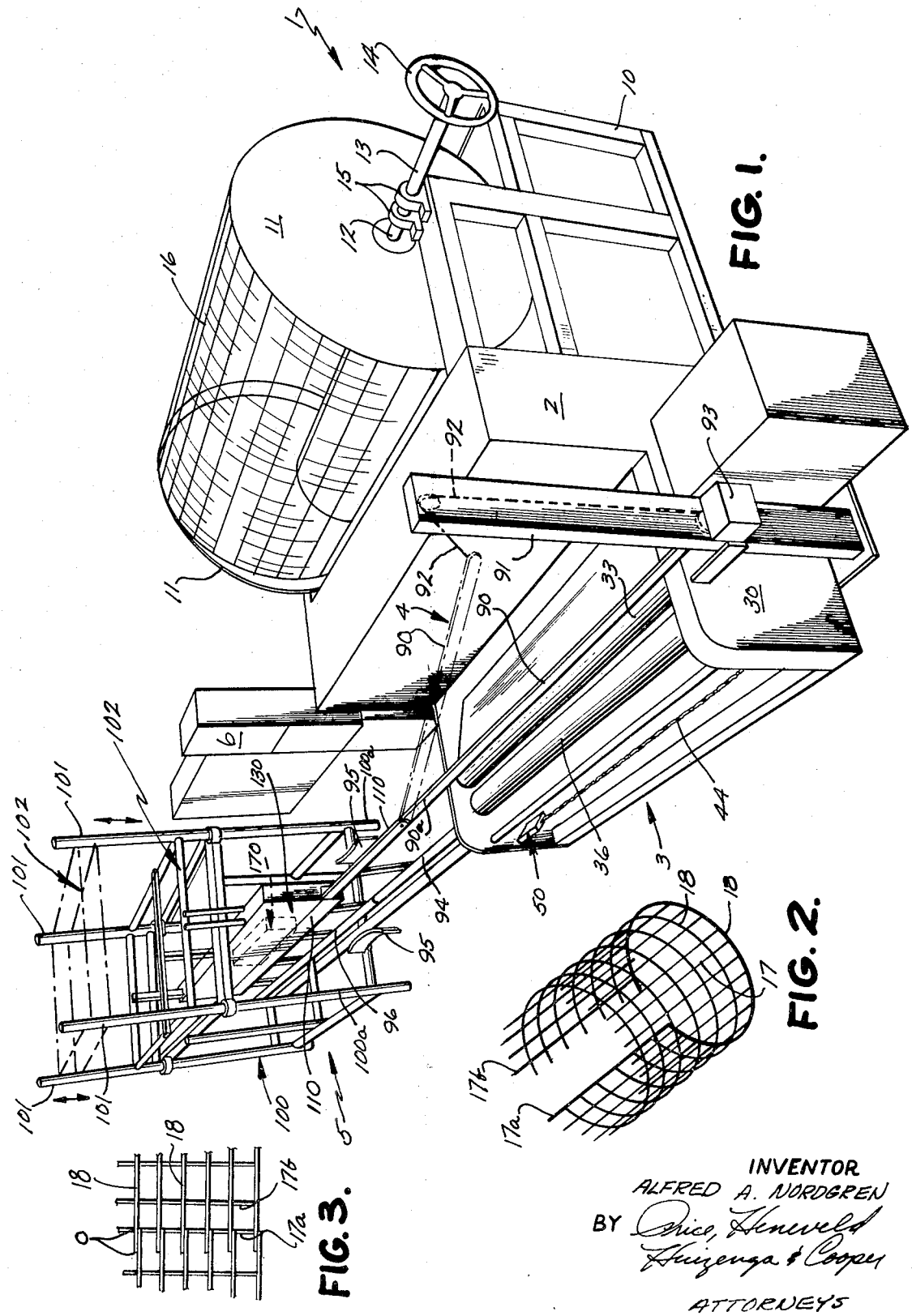
INVENTOR.
ALFRED A. NORDGREN
BY Price, Heneveld
Huizenga & Cooper
ATTORNEYS Patented July 25, 1972

INVENTOR.
ALFRED A. NORDGREN
BY
ATTORNEYS

INVENTOR
ALFRED A NORDGREN
BY
ATTORNEYS

Patented July 25, 1972

INVENTOR.
ALFRED A. NORDGREN
BY Price, Heneveld
Huizenga & Cooper
ATTORNEYS

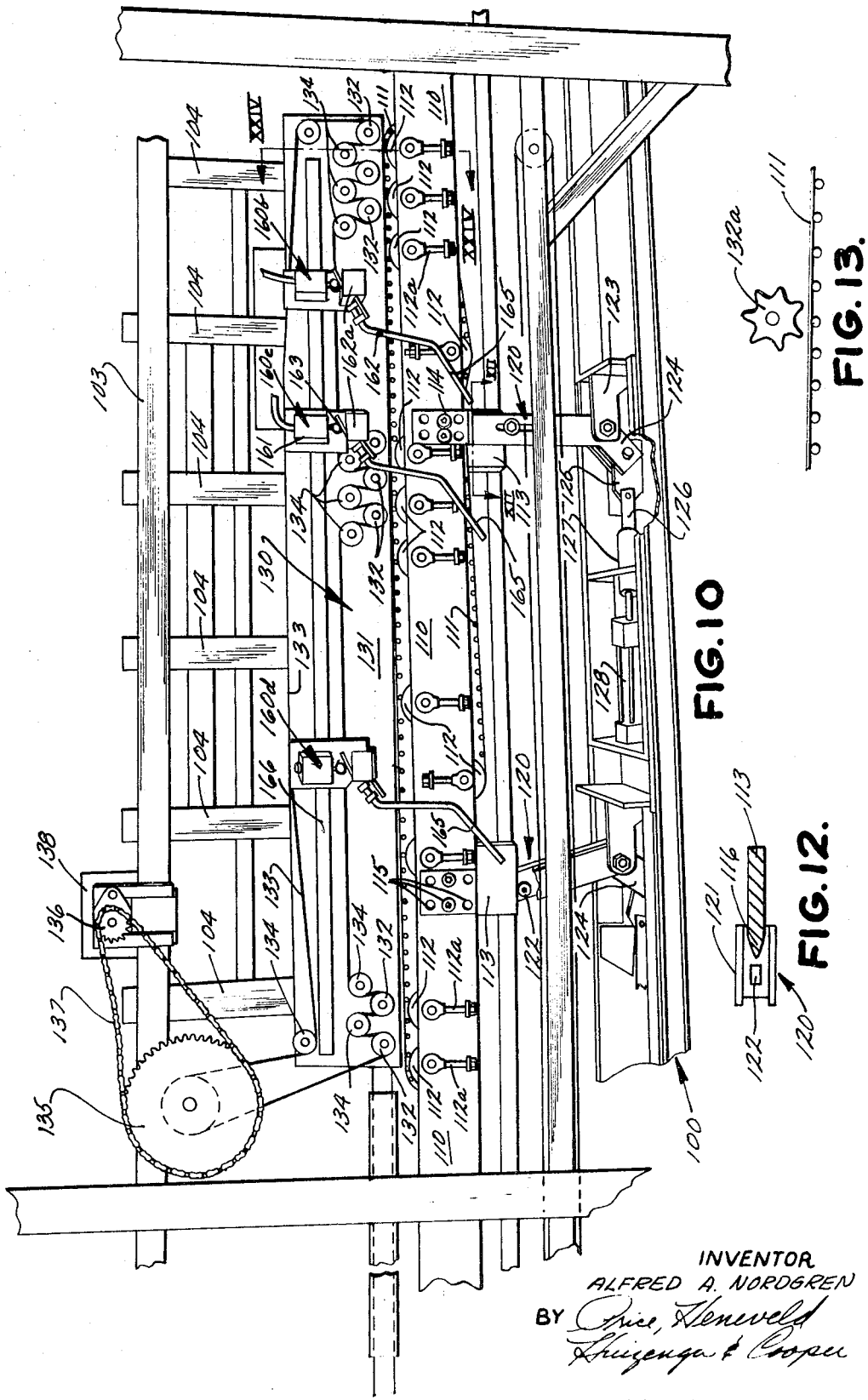

Patented July 25, 1972

INVENTOR.
ALFRED A. NORDGREN

BY Price, Heneveld
Huizenga & Cooper

ATTORNEYS

Patented July 25, 1972

INVENTOR.
ALFRED A. NORDGREN
BY

ATTORNEYS

INVENTOR.
ALFRED A. NORDGREN
BY
ATTORNEYS

INVENTOR
ALFRED A. NORDGREN

BY

ATTORNEYS

Patented July 25, 1972

INVENTOR
ALFRED A. NORDGREN

BY Price, Heneveld, Huizenga & Cooper

ATTORNEYS

3,678,971

APPARATUS AND METHOD FOR CAGE ROLLING AND WELDING

BACKGROUND

This invention relates to the manufacture of wire fabric reinforcing cages for use in the production of concrete pipe. These cages are comprised of a plurality of circumferential wires 18 joined by longitudinal wires 17 (FIG. 2). It encompasses all operations from the storage of a roll of wire fabric to the completion of welding the juxtaposed ends of the circumferential wires of the cage (FIG. 3). Thus, storing, shearing, forming, conveying and welding are all within the ambit of this invention.

Currently, most cage forming operations begin with a roll of wire fabric being suspended on a pipe. The fabric is pulled off the roll and sheared at a length sufficient to give the cage a desired circumference. The fabric is then fed, usually by hand, through a set of forming rollers. The cage so formed is then transferred by one or two men to a welding station. Frequently, this is accomplished through the use of an overhead conveyor which first has to be positioned above the cage, then has to be activated to lift the cage and finally has to be moved into position above the welding station. The cage is then clamped in such a manner that the juxtaposed ends of each circumferential wire are in approximate alignment such that an operator can manually weld them together. In this manner, one or two men can form and another can weld approximately 250 cages per day.

To the inventor's knowledge, only one type of apparatus has been previously developed for automatically welding cages. This was developed by the inventor himself and is disclosed in U.S. Pat. No. 3,370,150. In this apparatus, a cage is placed on a welding station and is clamped in such a fashion that all of the juxtaposed ends of the circumferentials are clamped together simultaneously. A welder then moves across the stationary cage and automatically welds the juxtaposed ends. While this apparatus may be superior in some ways to a hand-welding operation, it does suffer from drawbacks which make it uneconomical for a concrete pipe producer to invest in the apparatus. First of all, it is extremely difficult to clamp all of the juxtaposed ends of the circumferential wires together simultaneously. Accordingly, too many juxtaposed ends are not welded together by the welding apparatus as it moves across the stationary cage and have to subsequently be welded by hand. Secondly, the apparatus is quite slow since it takes a rather lengthy period of time for the welding apparatus to move across the stationary cage. Thus, this welding apparatus has not met with any wide degree of commercial success.

Some operations do use storage apparatus which is more sophisticated than that outlined above. Fabric rolls are sometimes placed onto beds of support rollers with the fabric being held in place between stationary plates. In such systems, the fabric may even be fed out of the storage bed into a shearing station by a drive system. The sheared fabric is then fed into a set of pinch rollers which are driven by a separate drive means. One of the drawbacks of this prior art system is that the stationary plates of the fabric crib cause the ends of the longitudinal wires to bend as the fabric is unrolled. The longitudinal wires are those which extend the width of the fabric roll and are so-called because these are the wires which extend lengthwise of a completed cage. Additionally, it is necessary with storage beds of this type to provide separate storage beds for fabric rolls of different widths. Finally, the above described operation suffers in that two separate drive systems are required, one for the crib feed system and one for the forming roller system. Thus, this operation, while more sophisticated than that originally described, is considerably more expensive and still suffers from a number of drawbacks.

The instant invention includes a means for forming wire fabric into a cage and a completely new and revolutionary means for welding the juxtaposed ends of the circumferential wires of the cage. Additionally, means are included for conveying the cage from the forming means past the welding means. The conveying means are positioned relative to the forming means such that the cage is formed in operable alignment with the conveying means permitting the conveying means, upon actuation thereof, to automatically engage the cage. The welding means includes a means for sensing a passing circumferential wire and initiating welding in response thereto whereby the cage is welded automatically as it passes the welding means.

Other additional and narrower aspects of the invention are numerous. As the cage is conveyed past the welder, it is supported by a beam which floats in effect on a plurality of supports. Each support can be selectively disengaged from the beam such that the cage can be moved past the disengaged support. Means are provided for elevating the position of the beam and the position of the welding means such that cages of different diameters can be welded.

The welding means itself is movable in the same direction as the conveying means but is biased towards movement in the opposite direction such that it moves with the cage while a pair of wires are being welded, but moves towards the next set of unwelded wires upon completion of the weld. The welding means also includes a means for sensing the presence of wire adjacent thereto, means movable into engagement with juxtaposed ends in response to the sensing for holding the juxtaposed wires together, and means for activating the welding means following engagement of the juxtaposed wires. In this manner, the wires are held tightly together while the welding operation is carried on.

The wire storage crib includes a pair of oppositely disposed circular retaining plates which are rotatably mounted such that they roll with the fabric roll as it is unwound. This prevents the ends of the wires from becoming deformed. At least one of the retainer plates is axially adjustable such that fabric rolls of different widths can be used. One of the crib rollers on the fabric roll includes a hand wheel which alleviates the task of feeding the wire fabric from the fabric roll into the drive rollers. Additionally, an auxiliary fabric roll supporting roller is provided which can be elevated into supporting engagement with the fabric roll when it has diminished in size, and thereby prevent it from falling between stationary crib rollers.

The forming apparatus and the feed rollers on the storage crib are driven by a common drive source. Clutch means are provided between the drive source and the feed rollers on the storage crib such that it can be disengaged after a length of fabric has been cut and is being formed. As fabric is formed on the forming rollers, it curves up over the pinch rollers which drive the fabric into the forming roller. In order to prevent it from going back through the pinch rollers, a receiving pan is provided which fits snugly against the top pinch roller. This pan can be elevated as the fabric is first fed through the pinch rollers and can then be lowered once the feeding operation has been completed.

The various features of this invention make it possible for one man to replace four or five men in a standard operation. Thus, one man can shear, form and weld one cage every 60 seconds or less. During a normal operating day, he can produce as many as 480 to 500 cages. Furthermore, the cages so formed are of better quality than are normally produced in existing operations. The welds in the juxtaposed ends of the circumferentials are almost perfectly uniform. Furthermore, a good weld is assured by the holding means whereby the wires are held together during welding. Deformed longitudinal wires are almost completely eliminated by the unique storage crib apparatus. These and other aspects of this invention make it one of the most significant contributions to this art in years.

BRIEF DESCRIPTION OF THE DRAWINGS

FIG. 1 is a perspective view of the overall forming and welding apparatus of this invention;

FIG. 2 is a perspective view of a portion of a cage which has just been rolled;

FIG. 3 is a fragmentary plan view of the overlapping portion of a cage showing the manner in which the ends of the circumferential wires are juxtaposed;

FIG. 10 is a side elevation of a portion of welding assembly 5;

FIG. 12 is a cross section taken along XII—XII of FIG. 10, showing a support 120 moving into engagement with a support plate 113 in order to support beam 110 of welding apparatus 5;

FIG. 13 is a schematic showing the interrelationship and nature of the upper welding conveyor wheels 132a and the beam conveyor 111;

PREFERRED EMBODIMENT

Figure 11:
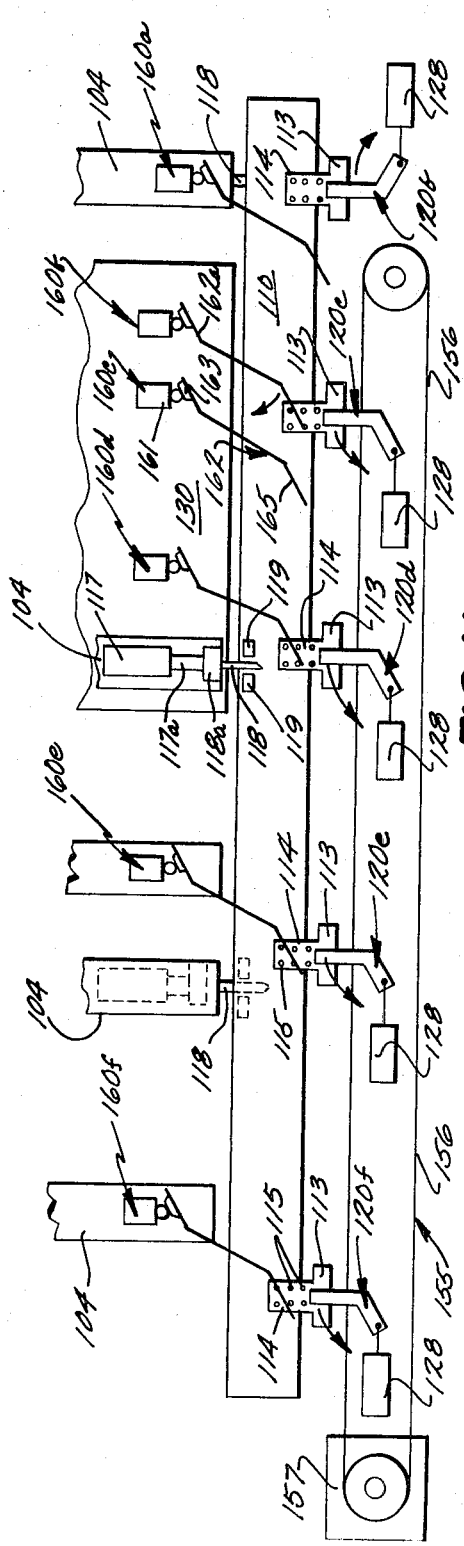
FIG. 11 is a schematic of the conveying means of welding apparatus 5.

Referring to FIG. 1, it can be seen that this invention includes a fabric storage crib 1, a shearing station 2, a forming station 3, a transfer assembly 4 which initiates conveying, a welding assembly 5 and a control unit 6. A roll of wire fabric 16 is shown in storage on storage crib 1. It is withdrawn from storage crib 1 and passed beneath the shear 2 and into former 3. At an appropriate length, the wire is cut by shearing station 2 and the cut fabric is formed into a circular or elliptical cage such as is shown in FIG. 2. It is then conveyed by transfer assembly 4 to the welding assembly 5 at which the juxtaposed ends of the circumferential wires are aligned in a manner such as is illustrated in FIg. 3 and welded.

FABRIC STORAGE CRIB, SHEARING STATION AND FORMING STATION

Figure 22:
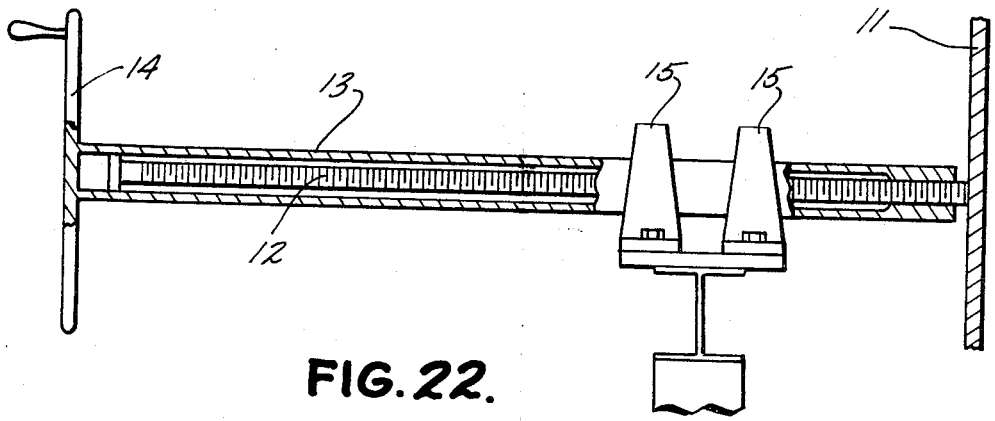
FIG. 22 is a cross section of the adjustment assembly for the retaining plates.

Fabric crib 1 includes a support frame 10 which is comprised largely of steel beams and other conventionally used structural material (FIG. 1). A pair of oppositely disposed retainer plates 11 are rotatably mounted on frame 10 for the purpose of holding fabric roll 16 in place and insuring that it is unrolled in a properly oriented manner. Each retaining plate 11 is mounted on the end of a threaded shaft 12 which is threaded within an adjusting sleeve 13 (FIG. 22). Adjusting sleeve 13 is rotatably carried by pillow block bearings 15 and has a wheel 14 on the end thereof. As fabric 16 is unrolled, retaining plates 11 will tend to rotate thereby preventing the ends of the wire fabric from bending. As they rotate, threaded shaft 12 and adjusting sleeve 13 will rotate as a unit. However, if it is desired to adjust the plates 11 towards one another or away from one another, one can do so by rotating each of the adjusting wheels 14. The inertia of plate 11 is such that rotation of wheel 14 causes shaft 12 to thread within adjusting sleeve 13.

Figure 4:
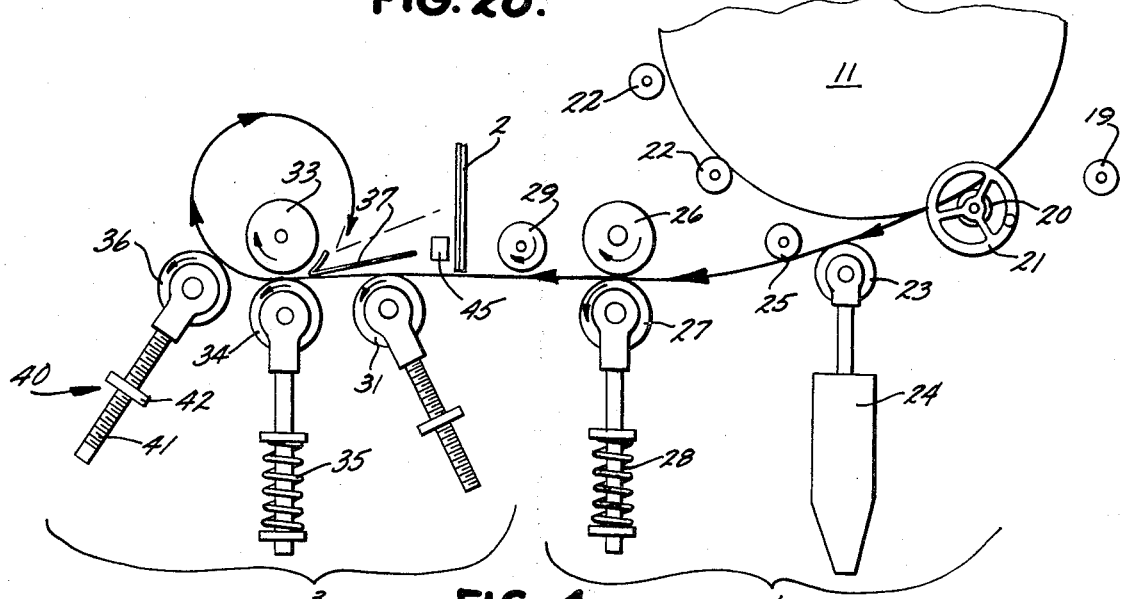
FIG. 4 is a schematic view of the various crib and forming rollers used in storing wire fabric and forming cages.

FIG. 4 is a schematic view of the various rollers which facilitate the storage, shearing and forming of the wire fabric. Those rollers which are power driven are designated by arrows which show the direction in which the rollers rotate. A bumper roller 19 is mounted on frame 10 to facilitate the loading of a roll of fabric 16 into position between plates 11. Crib rollers 20 and 22 are provided to support fabric roll 16 in position between plates 11. These rollers extend generally from one plate 11 to the other and are tangential with the plates. A hand wheel 21 is provided on crib roller 20 in order to facilitate the initial feeding of fabric from roll 16 to drive rollers 26 and 27 which will thereafter act to remove fabric from roll 16.

The fabric is fed down beneath a take-off roller 25 into engagement with drive rollers 26 and 27. Take-off roller 25 merely helps prevent the end of the wire fabric from curving upwardly rather than feeding into the drive rollers 26 and 27. Drive roller 27 is spring loaded by spring 28 which biases it towards engagement with top drive roller 26. This combination of a top driven roller and a spring loaded, driven bottom roller is commonly called a set of pinch rollers. These grasp the fabric firmly in order to unroll it from crib 1. Also, roller 27 expands downwardly as longitudinal wires 17 pass through the pinch rollers 26 and 27. All of the rollers are mounted on frame 10.

Because of the unique means by which wire can be fed through the use of hand wheel 21 to pinch rollers 26 and 27, a rather large distance must be left between crib rollers 20 and 22. Accordingly, as the roll of fabric diminishes, there is a possibility that eventually it will fall down between crib rollers 20 and 22. In order to prevent this occurrence, the inventor has provided an auxiliary crib roller 23 which is mounted on a hydraulic cylinder 24 (in turn secured to frame 10) such that it can be elevated into a position tangential with circular retaining plates 11. So elevated, it merely acts as any other of the crib rollers. However, in order to facilitate the initial feeding of fabric into the pinch rollers 26 and 27, roller 23 can be lowered by means of cylinder 24 in order to get it out of the way.

As fabric is driven through pinch rollers 26 and 27, it engages a flattening roller 29, mounted on frame 10, which tends to flatten the rolled curvature which the fabric has as a result of being stored in fabric roll 16. From thence the fabric passes beneath shear 2 and on into forming station 3. A measuring means 45 is positioned near shear 2 in order to measure the amount of fabric which has passed and to signal shear 2 to cut, once a desired length of fabric has passed. Measuring means 45 may operate either electrically or mechanically. For example, an electric eye may be provided to count the number of longitudinals which have passed. The shear 2 can be any conventional shearing apparatus known in the art. The type preferable is that which includes a clamping plate and a sloping knife mounted side by side. When the measuring means 45 indicates that a desired length has passed, shear 2 is automatically activated. The clamping plate comes down first and holds the fabric against a table above which the fabric passes. The sloping knife follows closely behind to cut the wire.

The rollers of forming station 3 are mounted to a supporting frame 30 which can be seen in FIG. 1. Referring again to FIG.

4, these rollers include first a guide roller 31 which tends to hold the fabric up and guide it into a second set of drive or pinch rollers 33 and 34. Again, bottom pinch roller 34 is biased by spring 35 into engagement with top pinch roller 33. These pinch rollers drive the fabric into engagement with a forming roller 36 which causes the fabric to bend up and around top pinch roller 33.

In order to prevent the end of the fabric from again entering pinch rollers 33 and 34, a receiving pan 37 is provided. It includes a roller guard portion which is curved according to the curvature of pinch roller 33 and which fits snugly thereagainst as the fabric is formed. It also includes a bottom portion extending upwardly from the bottom edge of the curved portion. Pan 37 is mounted on hydraulic cylinders (not shown) such that as fabric is first fed into the forming station 3 and into the pinch rollers 33 and 34, pan 37 can be elevated to the position shown in phantom in FIG. 4. Thus, it will not interfere with this feeding operation. Once the fabric cut by shearing station 2 has been engaged by pinch rollers 33 and 34, pan 37 is again moved downwardly by its hydraulic cylinders in order to allow the cage to curve the maximum possible distance around top pinch roller 33. In this way the cages formed are more perfectly circular (or elliptical if the forming roller 39 is adjusted during forming) than would otherwise be the case.

Figure 6:
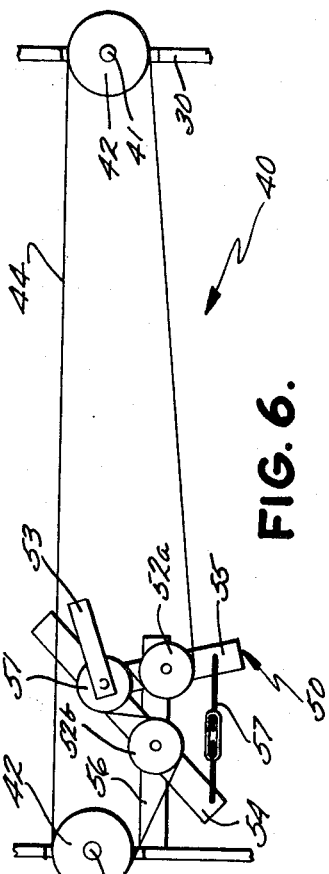
FIG. 6 is a schematic view showing the chain and ratchet means for adjusting the height of the forming roller in forming means 3.
Figure 5:
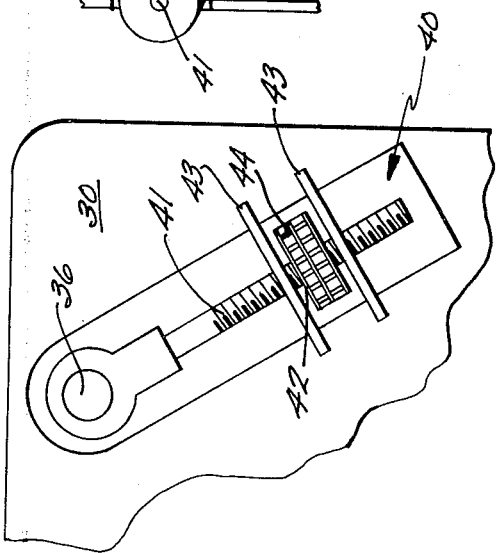
FIG. 5 is a fragmentary end view of the left end of forming apparatus 3 as it is viewed in FIG. 1.

In order to vary the diameter of the cage being rolled, forming roller 36 is adjustable by means of an adjustment assembly 40 (FIGS. 4, 5 and 6). Basically, each end of roller 36 is mounted on the end of a threaded post 41 which threads in a cogged nut 42. Referring to FIG. 5, it will be seen that nut 42 is rotatably carried between a pair of bearing plates 43 which are rigidly secured to frame 30. A sprocket chain 44 is then wrapped around both nuts 42 and extends between them across the front of forming apparatus 3 as is shown in FIGS. 1 and 6. By moving chain 44, the two nuts 42 are rotated and threaded posts 41 thread upwardly or downwardly in nuts 42 to thereby evenly adjust the height of roller 36 at both of its ends.

Figure 7:
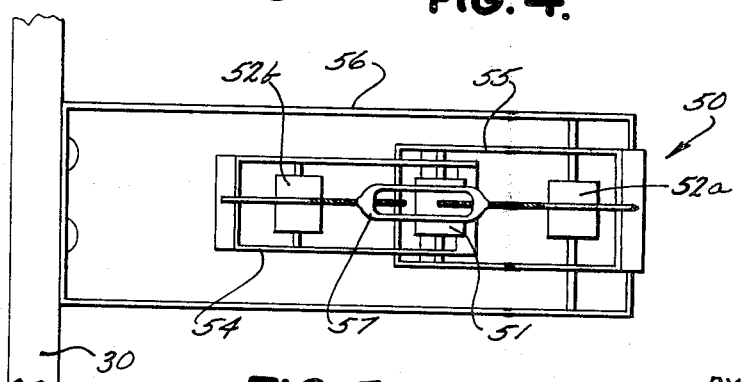
FIG. 7 is a side view of the ratchet adjusting assembly of FIG. 6 with the ratchet handle not being shown.

A special ratchet assembly 50 is provided for moving chain 44 (FIGS. 6 and 7). Referring to FIG. 6, it can be seen that ratchet assembly 50 includes a ratchet gear 51 and a pair of wrap gears 52a and 52b which are provided to insure a complete wrap of chain 44 about ratchet gear 51. A conventional ratchet handle 53 can be turned to thereby turn gear 51 and drive chain 44 around nuts 42. Referring to FIG. 7, it can be seen that the ratchet gear 51 and wrap gears 52a and 52b are mounted in three brackets, e.g., first bracket 54, second bracket 55 and third bracket 56. Each bracket comprises a rectangular steel frame. Wrap gear 52b is mounted at one end of bracket 54 and ratchet gear 51 is mounted at the other. The axle of wrap gear 52a extends through bracket 54 and is mounted in second bracket 55 such that first bracket 54 and second bracket 55 are in pivotal relationship to one another. The remaining wrap gear 52a is then mounted at the other end of second bracket 55 and its axle extends through bracket 55 and into engagement with bracket 56. In this manner, second bracket 55 and third bracket 56 are in pivotal relationship to one another. The chain wraps around wrap gear 52a, ratchet gear 51 and then wrap gear 52b. In order to adjust the tension of chain 44 around these gears, a turnbuckle 57 is provided between the free ends of first bracket 54 and second bracket 55. The entire ratchet assembly 50 is then mounted to frame 30 by bolting the end of third bracket 56 to frame 30.

DRIVE ASSEMBLY FOR STORAGE CRIB 1 AND FORMING STATION 3

Figure 8:
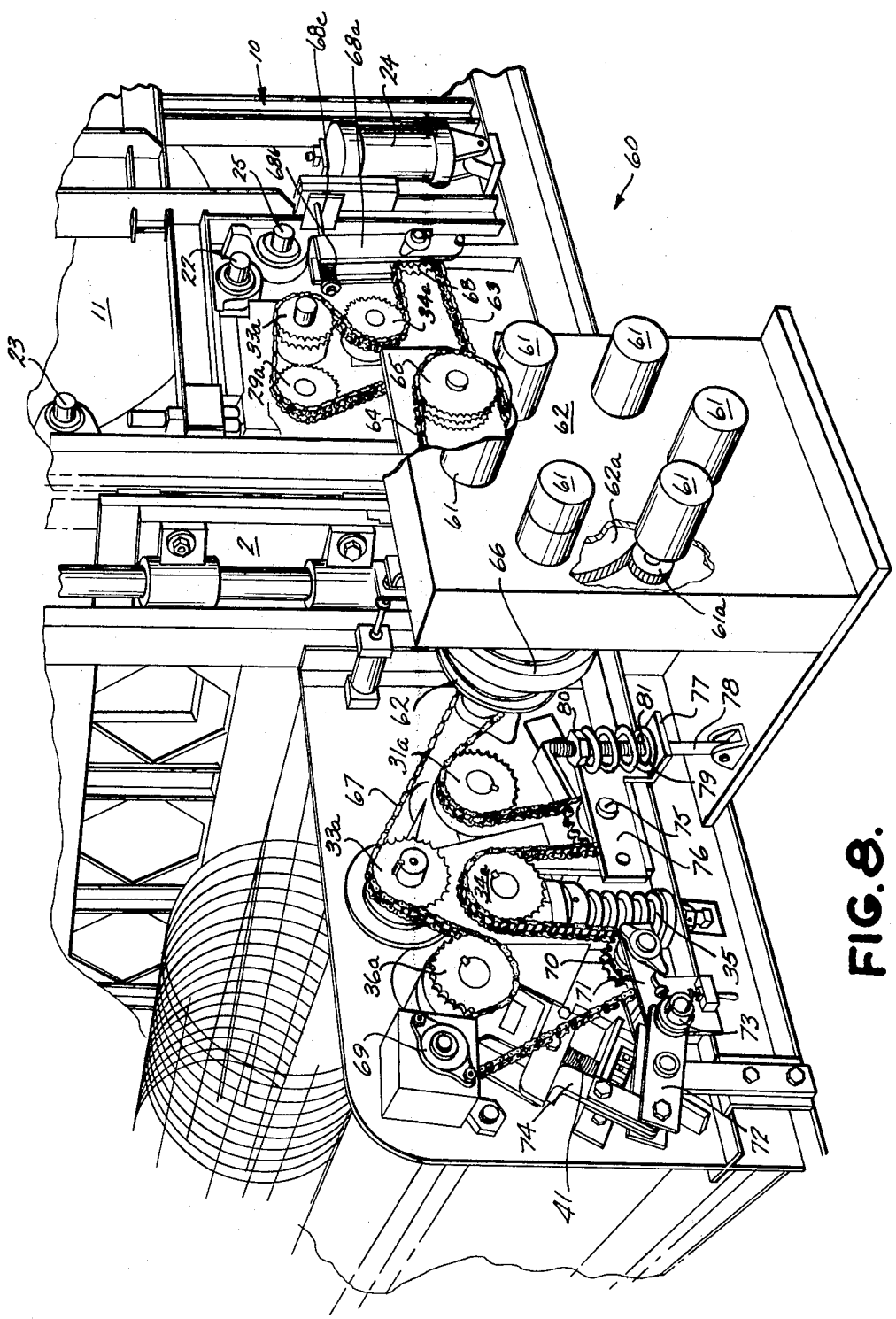
FIG. 8 is a perspective view of the right end of storage means 1, shearing means 2 and forming means 3.

The driven rollers of storage crib 1 and forming station 3 are driven by a common drive assembly 60 (FIG. 8). Six hydraulic motors 61 spaced hexagonally about a suitable drive gear 62a, drive a main drive shaft 62 (FIG. 8). Each motor 61 drives a pinion 61a which engages gear 62a. If any one motor 61 breaks down, the unit will not be shut down since the remaining five motors 61 will continue to drive shaft 62. Main drive shaft 62 drives a rear chain 63 through a clutch chain 64 and a gear transfer assembly 65. Transfer gears 65 comprise a pair of adjacent gears mounted on a common axle. One is driven by chain 64 while the other transfers this motion to chain 63. Clutch chain 64 is driven by drive shaft 62 and itself drives transfer gears 65 whereby the drive of shaft 62 is transferred to rear drive chain 63 in a conventional manner. Drive shaft 62 includes a clutch assembly 66 whereby drive shaft 62 can be disengaged from clutch chain 64 in order that the rotation of the rollers of storage crib 1 can be stopped. A schematic view of this drive is provided in FIG. 23. Front chain 67 is also driven by main drive shaft 62 but there is no necessity for a clutch therebetween.

The drive chains 63 and 67 drive a plurality of gears which in turn rotate the various driven rollers which have heretofore been discussed. In order to avoid confusion, the various gears which are connected to the ends of rollers for driving them have been designated with the same number as has been given to the rollers along with the letter a. On the other hand, idler gears which do not themselves drive any rollers have been separately identified.

Figure 23:
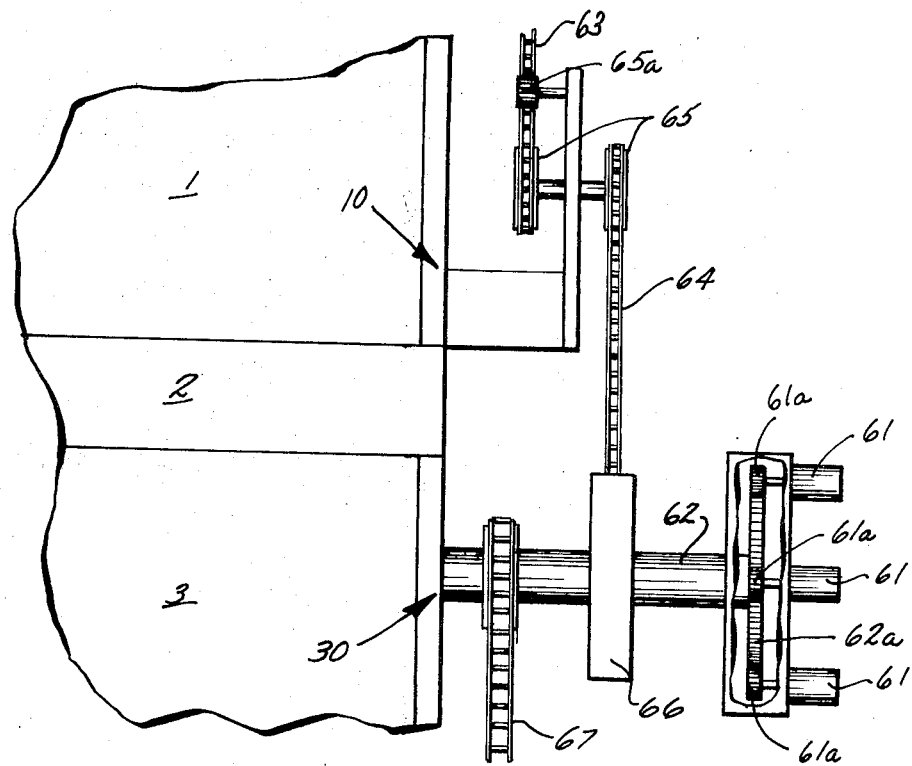
FIG. 23 is a schematic plan view of the drive assembly for the feed and forming rollers.

Referring to FIG. 8, it can be seen that rear drive chain 63 drives gear 29a of flattening roller 29, and gears 33a and 34a which in turn rotate pinch rollers 33 and 34. Additionally, rear chain 63 is wrapped around a spring biased idler gear 68. Idler gear 68 is mounted on a lever 68a which is pivotally mounted at one end to frame 10. The free end of lever 68a is spring loaded by spring 68b whose end is operably connected by rod 68c to frame 10. It also rides over a small idler gear 65a, adjacent transfer gear 65 (FIG. 23).

Front drive chain 67 extends over gear 33a of top pinch roller 33, under gear 36a of forming roller 36, over an idler gear 69 (hidden), under an automatically adjustable idler gear 70, over gear 34a of bottom pinch roller 34, under a chain tensioning idler gear 75 and finally over gear 31a of guide roller 31.

Idler gear 70 is automatically adjustable so that the height of forming roller 36 can be changed without necessitating dual gear adjustment, or in the alternative, changing the length of drive chain 67. Gear 70 is mounted on a floating lever 71, so-called because it in turn is pivotally mounted at its end to another lever 72. A coil spring 73 forces floating lever 71 downwardly in order to keep tension on drive chain 67. Lever 72 is pivotally mounted at its center to frame 30 and is pivotally connected at its opposite end to a bracket 74 which in turn is operably secured to threaded post 41. Thus, a downward adjustment of post 36a causes lever 72 to pivot about its center pivotal mounting, thereby causing idler gear 70 to move upwardly. Conversely, an upward adjustment of roller 36 automatically causes gear 70 to adjust downwardly.

Idler gear 75 is uniquely spring loaded so that it maintains an even tension on drive chain 67 as bottom pinch roller 34a is forced downwardly by the passage of a longitudinal wire through pinch rollers 33 and 34. Gear 75 is mounted approximately in the middle of a lever 76 which is pivotally mounted at one end to frame 30. At its other end, there is a horizontal flange 77 having a hole therein to slidably accommodate a threaded post 78 which is pivotally mounted to frame 30. A spring 79 is maintained between flange 77 and a compression nut 80 on post 78 such that lever 76 and idler gear 75 are biased downwardly. The extent to which the free end of lever 76 can move upwardly is limited by a stop nut 81 threaded on post 78 for engagement by flange 77.

TRANSFER UNIT

Transfer unit 4 is a conveying unit which removes a formed cage from forming station 3 and conveys it to welding assembly 5. It is part of an overall conveying system which ultimately conveys a formed cage past a collaborator-welder 170 (FIG. 1) where the juxtaposed ends of the circumferential wires 18 (FIG. 3) are welded together.

Transfer unit 4 includes a long boom 90 (FIG. 1) which is pivotally mounted at one end 90a to floating beam 110 of welding assembly 5. From thence it extends out over forming station 3 parallel to, and closely adjacent top pinch roller 33. The free end of boom 90 is secured to a chain 92 which extends upwardly over a pulley in the top of an elevator tower 91. The end of chain 92 is connected to a winding motor 93 whereby the free end of boom 90 can be elevated, thus pivoting boom 90 about its pivoted end 90a.

Because boom 90 is closely adjacent top pinch roller 33, a cage which is formed by forming roller 36 is bent up and around boom 90 as well as around pinch roller 33. Once the cage is formed, boom 90 is elevated, removing the formed cage from forming station 3 and allowing it to slide down boom 90 to welding station 5. When boom 90 is then lowered, the formed cage comes to rest on a pair of roller pipes 94, one of which is mounted on either side of boom 90 (only one roller pipe 94 is visible in FIG. 1). Roller pipes 94 are rollably mounted on a pair of side rails 96 which extend from about 12 feet in front of welding assembly 5 on down to the rear end thereof. Pipes 94 are rollably mounted on side rails 96 in order that a formed cage can readily be rolled around until the juxtaposed ends of the circumferential wires are properly oriented at the top of beam 110. Finally, transfer assembly 4 is completed by a pair of funnel flanges 95 movably mounted to the frame 100 of welding unit 5 on either side of beam 110 near the front end thereof. These act to funnel a cage into welding assembly 5 in a proper orientation to be welded.

WELDING ASSEMBLY 5

Superstructure

Referring to FIG. 1, the structure of welding unit 5 includes a foundation or lower frame 100 and an elevator frame 102 mounted on top thereof. Foundation frame 100 includes four corner posts 100a to the top of which are mounted four hydraulic cylinders 101. Elevator frame 102 is rigidly secured to the moving pistons of cylinders 101 such that its elevation can be varied as is indicated in phantom in FIG. 1. Elevator frame 102 includes a center longitudinal beam 103 (FIG. 9) secured thereto from which a plurality of brackets 104 depend downwardly to provide mounting means for various elements which are preferably elevatable with elevator frame 102.

Floating Beam

Beam 110, which has been mentioned supra, provides support for a formed cage as it progresses past the welder-collaborator 170 (FIG. 1). Referring to FIG. 10, it can be seen that beam 110 includes a continuous belt-type conveyor 111 which travels over a plurality of spring loaded idler wheels 112. The spring loaded mountings for these wheels have been designated 112a. Conveyor 111 acts both to support a cage as it is welded and to aid in conveying it past the welder-collaborator 170.

Beam 110 is referred to as a floating beam because it is supported by a plurality of beam supports 120 mounted on frame 100 which can be selectively disengaged from beam 110 in order to allow a cage to pass (FIG. 11). There are 6 such supports 120 in all and they have been labeled 120a through 120f. Support 120a is actually located beneath boom 90 which is in effect a pivoted extension of beam 110. The only difference between support 120a and the remaining supports is that it is normally out of engagement with boom 90 whereas supports 120b through 120f are normally in engagement with beam 110.

Secured to beam 110 and its pivotal extension boom 90 are an equal number of downwardly depending brackets 114 having support plates 113 on the ends thereof (FIGS. 10 and 11). Each beam support 120 includes a forked top 121 (FIG. 12) which embraces support plate 113 on either side thereof. Support plate 113 includes a knife edge 116 which allows the support 120 a small amount of lateral leeway as it comes into engagement with plate 113. Located in the base of forked top 121 is a wheel 122 which is spring biased upwardly. This engages the bottom of plate 113 as support 120 moves into engagement therewith and thereby minimizes friction between the two during the engaging operation.

Each support 120 is pivotally mounted to a pivot mount 123 which in turn is rigidly secured to foundation frame 100 (FIG. 10). Extending downwardly from the pivot point at an angle to the upper portion of support 120 is a lever portion 124. The end of lever portion 124 is pivotally joined to a link 125 which in turn is pivotally joined to the piston rod 126 of a hydraulic cylinder 128. Hydraulic cylinder 128 is rigidly mounted to foundation frame 100 and piston rod 126 slides within a sleeve 127 which is also rigidly mounted to frame 100. Support 120a and support 120b are mounted to pivot in a direction opposite to the direction of travel of the cage as it is conveyed, as can be seen by reference to FIGS. 9 and 11. Supports 120c through 120f are mounted to pivot in the direction of travel of the cage.

The height of beam 110 can be varied by changing the relative position of brackets 114 with respect to beam 110. Each bracket 114 includes three sets of mounting holes 115 (FIGS. 10 and 11). By using a different set of holes to bolt bracket 114 to beam 110, one can change the relative elevation of beam 110 with respect to the supports 120. Several different sets of mounting brackets 114 and depending plates 113 can be made available for increasing the variety of elevations which are available. In this manner, the elevation of beam 110 can be changed in accordance with the relative elevation selected for elevator frame 102 and its depending members.

While the forked tops 121 of supports 120 act to give beam 110 lateral stability, longitudinal stability is provided by three stabilizer bars 118 (FIG. 11). A stabilizer bar 118 is positioned near the front of beam 110 and is generally hidden in FIG. 11. Another is positioned approximately in the middle of beam 110 and is visible in FIG. 11. The third is positioned on down beam 110. As can be seen by reference to the center stabilizer bar 118 whose assembly is visible in FIG. 11, it is welded to the end of a piston 117a of a hydraulic cylinder 117. It is slidably carried in a sleeve 118a which is also of a square cross section. Both sleeve 118a and cylinder 117 are rigidly secured to downwardly depending mounting bracket 104. Each stabilizer bar 118 can be injected by cylinder 117 into engagement with a pair of fore and aft stop lugs 119 on beam 110. The tip of bar 118 is knife-shaped in a manner comparable to the leading edge of support plates 113 such that a certain amount of leeway is provided in order to facilitate the engaging operation. Stabilizing bar 118 can also be elevated out of engagement with stop lugs 119 such that a formed cage is free to pass along beam 110 without being stopped by stabilizer bar 118.

Welding Conveyors

Figure 24:
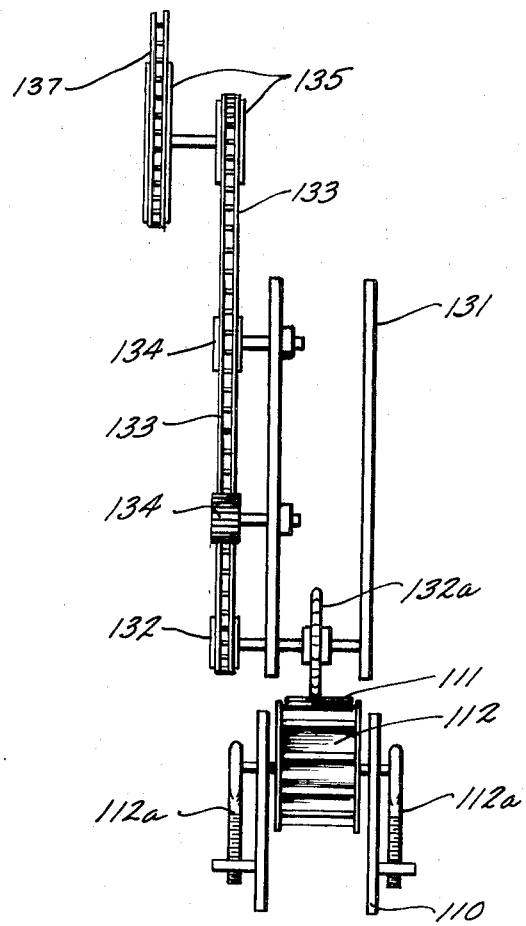
FIG. 24 is a schematic cross section taken along XXIV—XXIV of FIG. 10.

In addition to boom 90 which acts as a conveyor, there are three welding conveyors all of which aid in conveying a cage past welder-collaborator 170. Upper conveyor 130 (FIGS. 1, 9 and 10) includes a frame 131 which is rigidly secured to a plurality of downwardly depending mounting brackets 104. Mounted thereon are a plurality of conveyor wheels 132a which are driven by a chain 133 which rides over drive gears 132, mounted on axles common to wheels 132a (FIG. 24) and over a plurality of idler gears 134. (FIG. 10). Chain 133 is driven by a drive transfer gear assembly 135 (two gears on a common axle) which in turn is driven by chain 137 via drive gear 136 and its drive motor 138. Each conveyor wheel 132a comprises a wheel with teeth extending radially therefrom as is indicated in FIG. 13. The teeth of each wheel 132a act to grab the circumferential wires of the cage and thereby push it along. Thus, the top of a cage is sandwiched between conveyor wheels 132a (and their frame 131) and continuous conveyor belt 111 (FIGS. 10 and 13). Wheels 132a are geared to rotate slightly faster than belt 111 travels, such that the opposite ends of each circumferential wire of the cage are held in reasonable juxtaposition.

Figure 14:
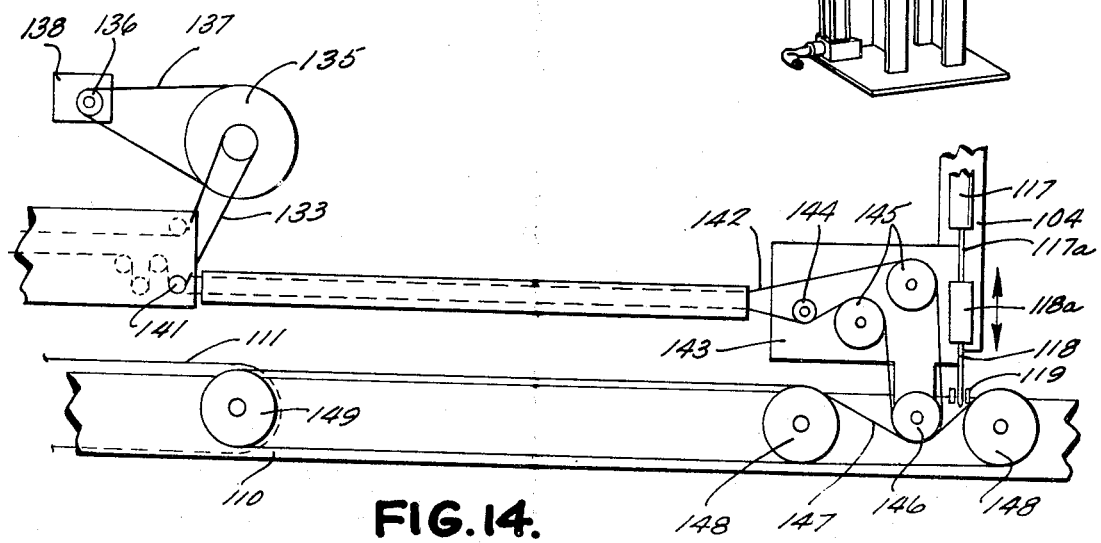
FIG. 14 is a schematic view showing the nature of the drive system for beam conveyor 111.

The drive system for conveyor wheels 132a, including chain 133, drive transfer gears 135, chain 137, drive wheel 136 and motor 138, also serves as a drive source for beam conveyor 111 (FIG. 14). In addition to its drive gear 132, the rear-most conveyor wheel 132a on frame 131 includes a drive gear 141 mounted on the opposite side from gear 132. A chain 142 is driven by gear 141 over idler 144, inverter idlers 145 and a drive transfer gear assembly 146, all of which are mounted on a clutch plate 143. Drive transfer gear assembly 146 is a pair of adjacent gears mounted on a common axle such that one gear is driven by chain 142 while the other acts as a drive for a conveyor drive chain 147. Conveyor drive chain 147 is wrapped over a pair of idlers 148 and a drive transfer gear 149 which is mounted on a common axle with the end-most gear 112 of beam conveyor 111.

Clutch plate 143 is so designated because it can be moved up or down, thus moving drive transfer gears 146 into or out of engagement with conveyor drive chain 147. Clutch plate 143 is welded to a stabilizer bar 118 such as have been previously described. However, its guide sleeve 118a includes a slot extending from top to bottom thereof in order to allow clutch plate 143 to move with bar 118.

Figure 9:
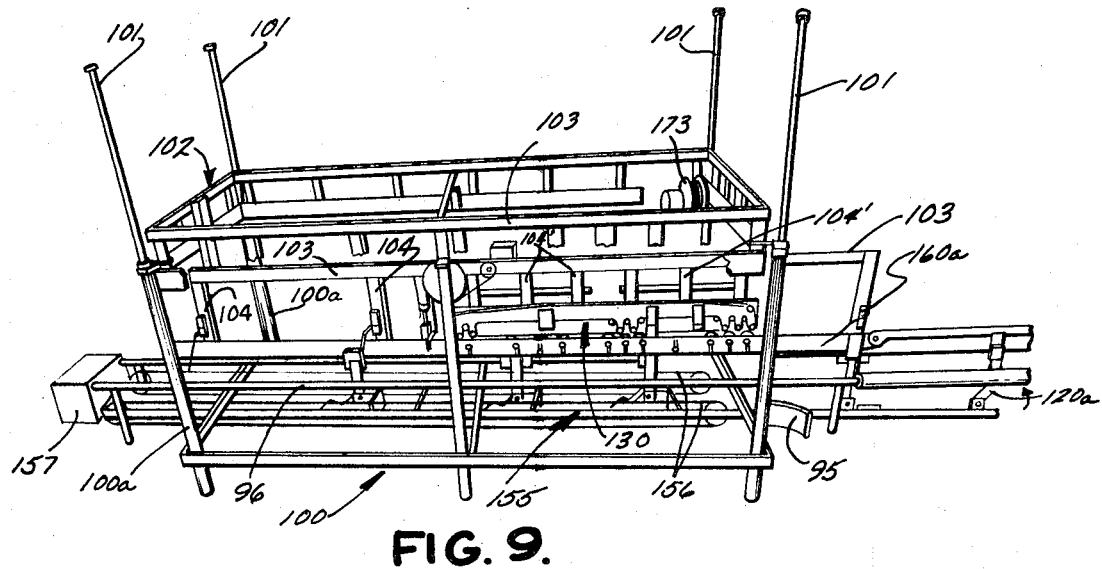
FIG. 9 is a slightly elevated perspective view of the welding assembly 5.

Finally, a bottom conveyor 155 is mounted on foundation support 100 in a position beneath beam 110, extending from a point near the front of beam 110 to a point at the rear thereof (FIGS. 9 and 11). It comprises a pair of parallel endless chains 156 wound on fore and aft sprockets and driven by a motor 157 at the rear of welding station 5. The engagement of conveyor 155 with the bottom of a cage being moved along beam 110 acts to minimize the effect of friction between the cage and side rails 96. Additionally, conveyor 155 can be driven at two speeds by motor 157, a slower speed for conveying the cage past welder-collaborator 170 and a faster speed for moving the cage from the end of upper conveyor 130 and beam conveyor 111 to the end of welding station 5. At this higher speed, conveyor 155 acts as an egress conveyor for a completely welded cage.

Gate Switches

The engaging and disengaging action of supports 120 and stabilizer bars 118 is controlled by a plurality of gate switches 160 of which there are six, labeled 160a through 160f (FIG. 11). Switches 160a, 160e and 160f are mounted directly to downwardly depending mounting flanges 104. The remaining switches 160b through 160d are mounted on a spacer bar 166 which in turn is rigidly mounted to frame 131 of upper conveyor 130. Bar 166 spaces them slightly from the surface of frame 131 in order to allow clearance for the drive action of chain 133.

Switch assembly 160a controls the disengagement and engagement of support 120b while switch assembly 160b controls the engagement and disengagement of support 120a with beam 90. The remaining switch assemblies 160c through 160f control supports 120c through 120f respectively in a manner which will be described subsequently.

Referring to switch 160c on either FIG. 10 or 11, it can be seen that each switch 160 includes a limit switch 161 which is engaged by the end 163 of a lever 162 which is pivotally mounted at point 162a. Each lever 162 includes a central portion extending downwardly from its pivoted end at a steep angle across the path traveled by the top portion of a cage on beam 110. A so-called extension portion 165 then slopes gradually rearwardly (to the left in FIGS. 10 and 11). The relatively steep angle of the central portion of lever 162 insures swift activation of limit switch 161 when it is contacted by a traveling cage while the more gradually sloping extension portion 165 increases the distance over which the cage and lever 162 will remain in contact without substantially increasing the number of degrees through which the lever 162 must be pivoted.

Welder-Collaborator

Welder-collaborator assembly 170 is so-called because it simultaneously holds (collaborates) and welds the juxtaposed ends of a circumferential wire 18. It includes a welding gun 171 (FIG. 15) which is part of a conventional MEG welder assembly. Gas line 172 can be seen leading to gun 171. A Hobard 180° gun, model 377-226 has been found satisfactory. One assembly for controlling and supplying the gun which has been found particularly well adapted for use in this invention is that manufactured by Miller under the model designation DIP-RIG-0. The 250 amp supply source is designated by Miller as CP-250-TS, and the electronic timer for timing the weld cycle is designated by the manufacturer as 054-187. Welding wire is fed from a roll 173 mounted on the top of elevator frame 103 (FIG. 9) and extends down through a feed tube to the tip of welder gun 171.

Figure 16:
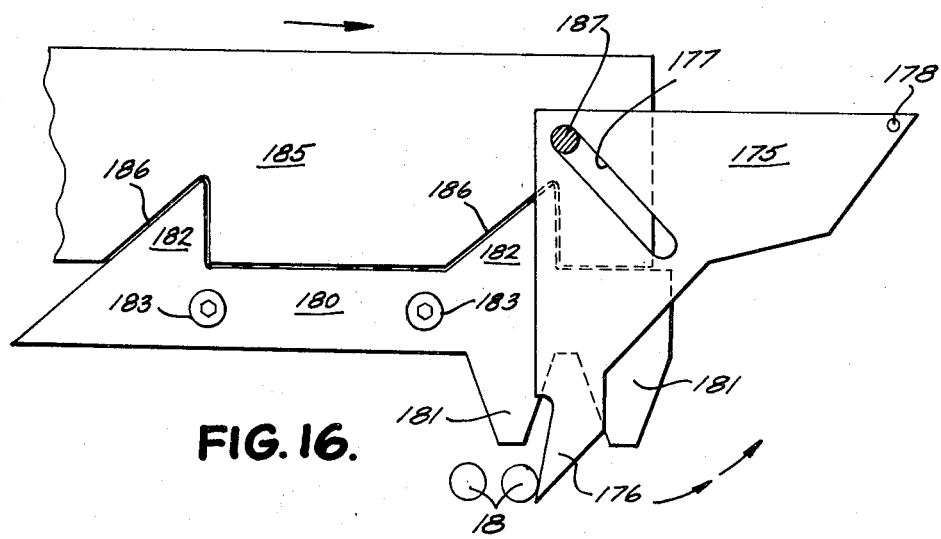
FIG. 16 is a side elevation of the key components of welder-collaborator 170.
Figure 17:
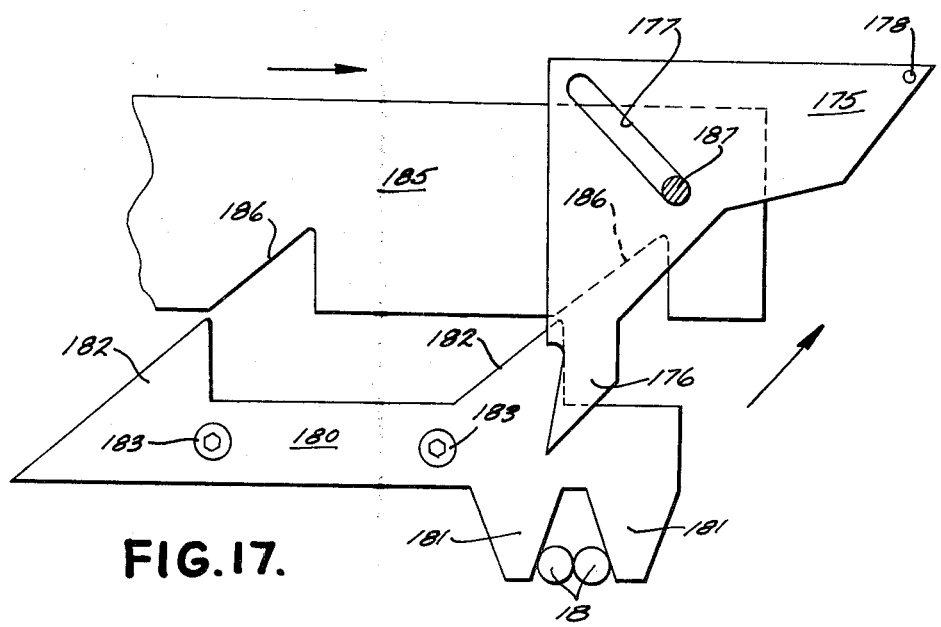
FIG. 17 is another side elevation of the components of FIG. 16 in which plate 185 has been driven to the right.

The essence of the welder-collaborator are the sensing plate 175, holding fork 180 and drive plate 185 shown in FIGS. 16 and 17. Sensing plate 175 includes a downwardly extending sensing finger 176 and an elongated diagonal slot 177. Via slot 177, plate 175 is pivotally and slidably mounted on a stud 187 extending from the surface of drive plate 185. Holding fork 180 is mounted directly below drive plate 185 and includes a pair of cams 182 which mate with a pair of cam openings 186 in drive plate 185. Additionally, holding fork 180 includes a pair of studs 183 extending from its surface to provide guidance in a manner which will subsequently be described. Depending downwardly from fork 180 are a pair of prongs 181 which form a generally V-shaped opening for engaging and holding a pair of juxtaposed ends of circumferential wire 18 in a manner indicated in FIG. 17.

Figure 18:
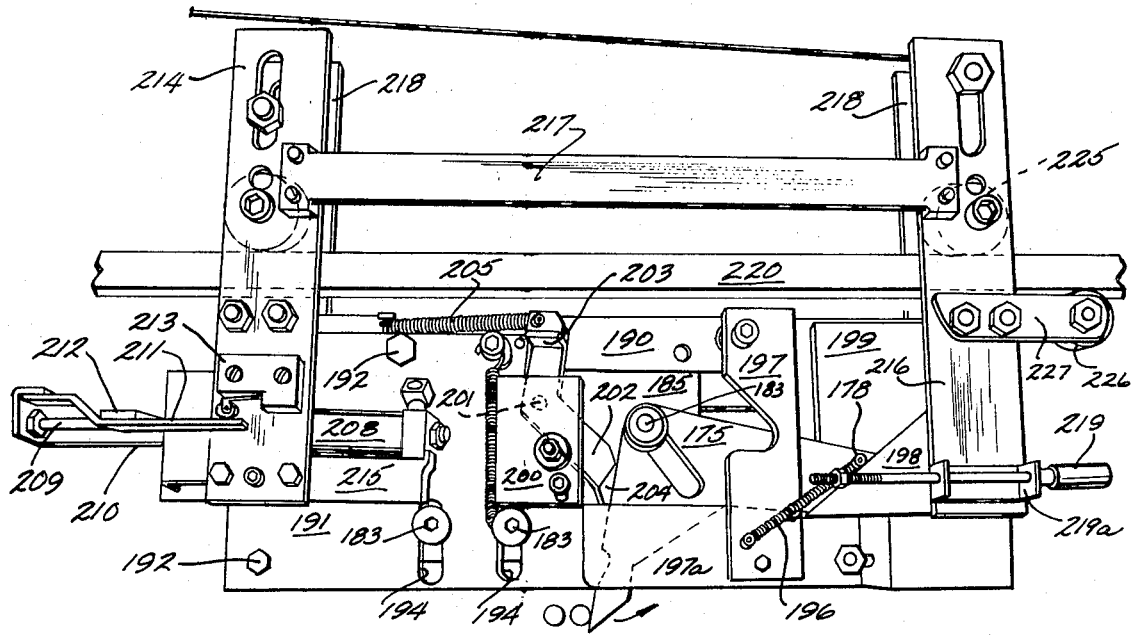
FIG. 18 is a side perspective view of welder-collaborator 170 with welding gun 171 removed.
Figure 19:
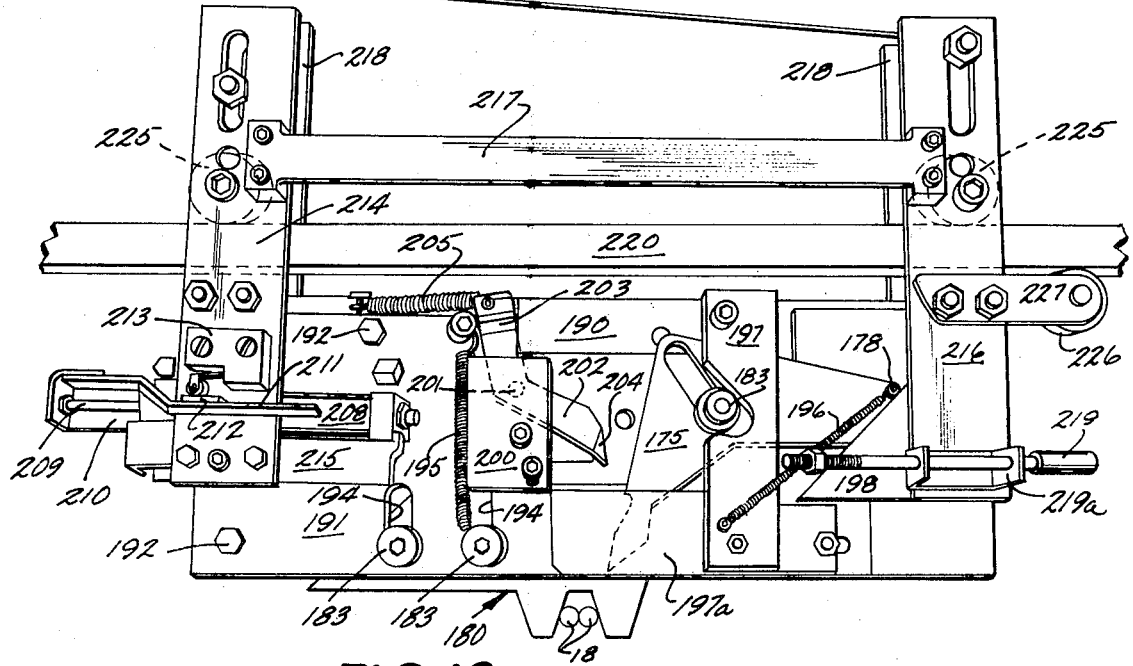
FIG. 19 is a view of the same thing after drive plate 185 has been driven to the right as in FIG. 17.

Holding fork 180 and drive plate 185 are mounted for slidable movement between a back plate 190 and a front plate 191 (see FIG. 25) which are bolted together in side by side relationships as at bolts 192 (FIGS. 18 and 19). Front plate 191 includes a pair of vertical slots 194 which accommodate studs 183 on holding fork 180 and thereby limit holding fork 180 to vertical movement. A spring 195 extends from one of the studs 183 to a stud mounted on front plate 191 and thereby biases holding fork 180 towards upward movement.

Sensing plate 175 is sandwiched for movement between drive plate 185 and a shim plate 199 on its back side and a bracket 197 and plate 197a on its front side. Shim plate 199, bracket 197 and plate 197a are all rigidly secured to back plate 190 by appropriate means. A spring 196 is joined to a stud 178 on the upper right-hand portion of sensing plate 175 and to a stud on bracket 197. This biases sensing plate 175 towards movement downwardly and forwardly. Stud 178 slides against the diagonal edge of a slide plate 198 which also acts to sandwich sensing plate 175.

The forward or left-hand edge of sensing plate 175 is engaged by the inwardly extending flanged point 204 of a trigger 202. Trigger 202 is sandwiched between front plate 191 and a switch mounting plate 200 which is bolted at its bottom to front plate 191. Switch plate 200 includes an inwardly extending stud 201 (hidden) upon which trigger 202 is pivotally mounted. Trigger 202 includes an outwardly extending flange 203 which engages the top of a limit switch 206, mounted on switch plate 200, in the manner shown in FIG. 15. Trigger 202 is joined at its top by a spring 205 to front plate 191 such that trigger 202 is biased for pivotal movement towards engagement with sensing plate 175 and towards engagement with limit switch 206.

Figure 15:
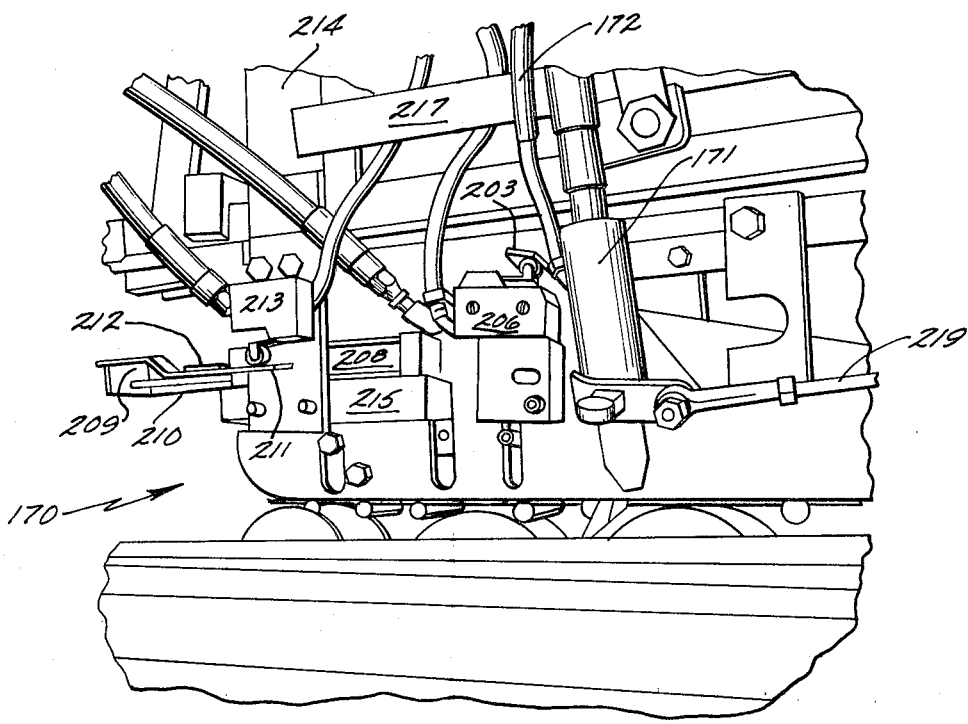
FIG. 15 is a perspective view of welder-collaborator 170.
Figure 25:
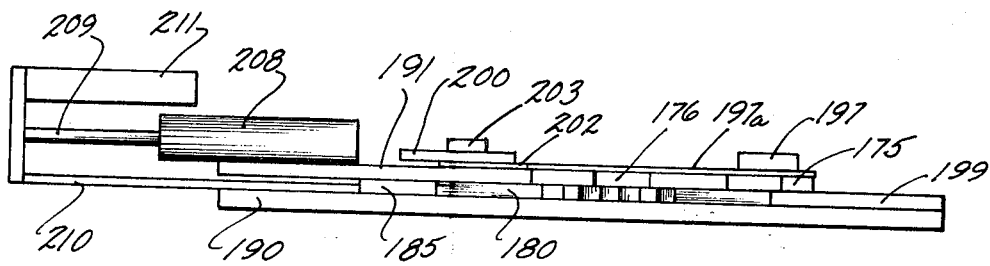
FIG. 25 is a bottom schematic view of welder-collaborator 170.

A hydraulic cylinder 208 is also mounted to front plate 191 (FIGS. 15, 18 and 19). It includes a rearwardly extending rod 209 to the end of which are rigidly secured a vertically oriented drive flange 210 and a horizontally oriented switching flange 211. Drive flange 210 is rigidly secured at its end to drive plate 185 (FIG. 25). Switching flange 211 extends beneath a limit switch 213 which is rigidly mounted to an upwardly extending bracket 214 which in turn is rigidly secured to front plate 191. A shim 215 is provided between bracket 214 and front plate 191 to provide clearance for cylinder 208. Switching flange 211 includes a contacting shim 212, the position of which can be adjusted along the length of switching flange 211 and the function of which is to engage limit switch 213 when rod 209 is driven by cylinder 208 to the right.

A bracket 216, comparable to bracket 214, is rigidly secured to the right front side of welder-collaborator 170 and a horizontal bracket 217 extends therebetween to provide a mounting bracket for welder gun 171 (FIGS. 15, 18 and 19). A threaded welder adjustment shaft 219 is rotatably mounted on a small bracket 219a near the bottom of bracket 216 (FIG. 18 and 19). The end of threaded shaft 219 is operably secured to the base of welder gun 171 in order to provide a means for adjusting the relative position of the tip of welder gun 171 (FIG. 15).

Figure 20:
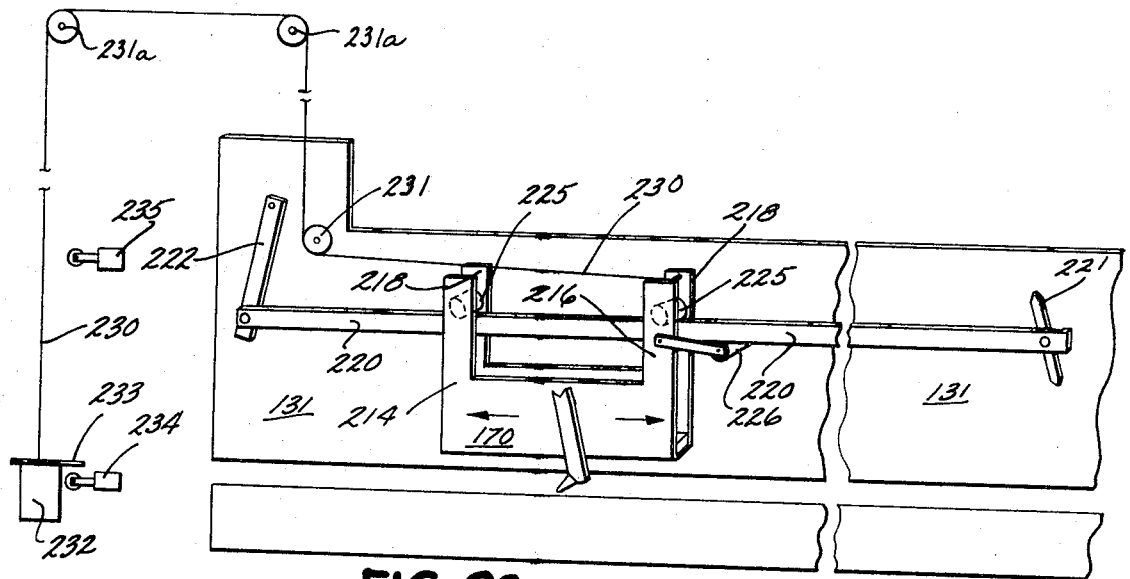
FIG. 20 is a schematic view showing the manner in which welder-collaborator 170 travels on track 220.

Welder-collaborator 170 is mounted for movement along a track 220 (FIGS. 18, 19 and 20) which merely comprises a long steel bar which is secured to, but spaced from frame 131 (FIG. 20). One end of bar 220 is adjustably mounted in a slot 221 in frame 131 while the other end of track 220 is hingedly mounted through hinge 222 to frame 131. One can adjust the relative height of welder-collaborator 170 by loosening the right end of track 220 in slot 221 and swinging it either forwardly or rearwardly on hinge 222.

Welder-collaborator 170 is rollably mounted on track 220 by means of front and rear rollers 225. Front roller 225 is rotatably mounted between bracket 214 and a rear bracket 218 which is comparable to bracket 214 and extends upwardly from rear plate 190. Similarly, rear roller 225 is rotatably mounted between bracket 216 and a second rear bracket 218. A third or bottom roller 226 is mounted on brackets 227 which are rigidly secured to bracket 216 and its matching rear bracket 218 (FIGS. 18 and 19). While rollers 225 engage the top of track 220, roller 226 engages its bottom.

While welder-collaborator 170 is movable in either direction on track 220, it is biased to movement towards the front of welding station 5, i.e., in a direction opposite to that traveled by a cage moving on upper conveyor 130, beam conveyor 111 and bottom conveyor 155. To achieve this bias, a cable 230 extends from the rear of welder-collaborator 170 (FIG. 20) under a pulley 231 on frame 131 and over a pair of pulleys 231a which are mounted on elevator frame 102. A large weight 232 is then connected to the end of cable 230. It includes a collar 233 which is capable of engaging a start limit switch 234 and a stop limit switch 235 positioned adjacent the vertical path traveled by weight 232. Limit switch 235 will stop all of the cage conveyors 130, 111 and 155, if welder-collaborator 170 moves too far to the rear of track 220 (the right in FIG. 20). As welder-collaborator 170 is then pulled back to the front of track 220, weight 232 will eventually contact start switch 234 which will again initiate operation of the cage conveyors.

AUXILIARY TRANSFER UNIT

Figure 21:
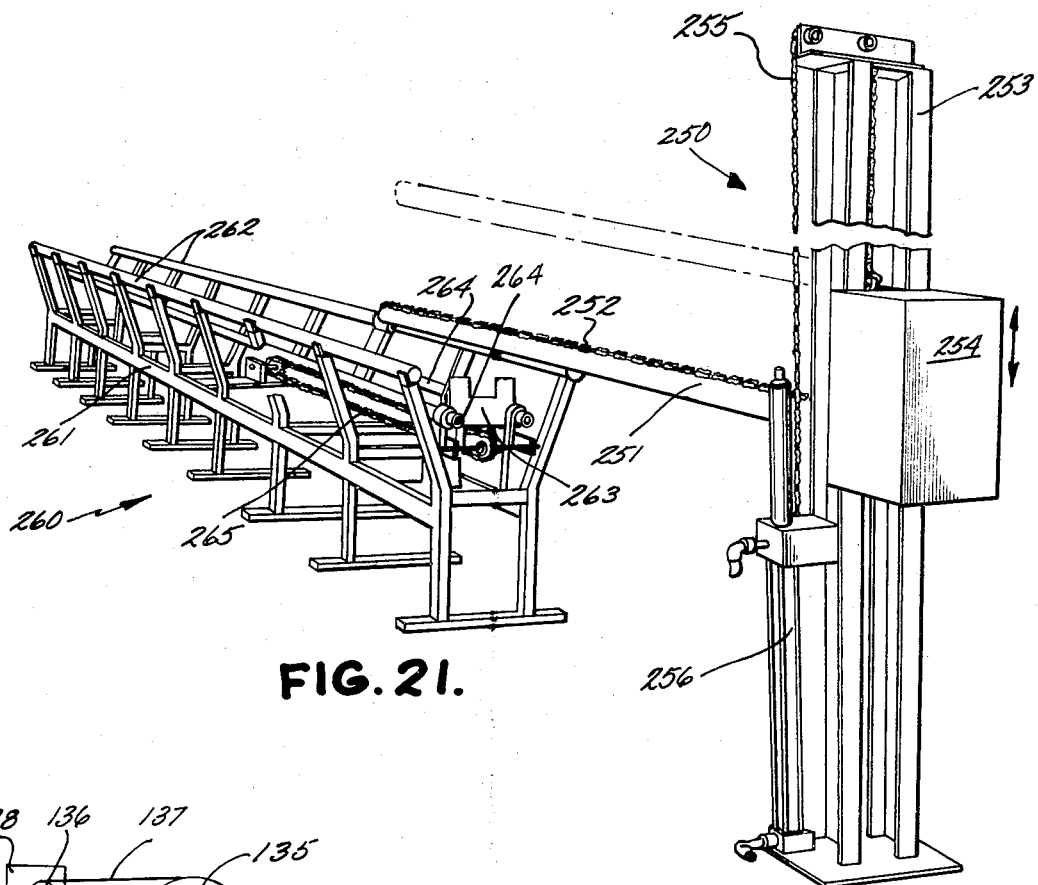
FIG. 21 is a perspective view of an alternative assembly for conveying a formed cage from forming apparatus 3 to welding apparatus 5.

While the pivoted boom 90 described earlier provides an excellent means for removing a formed cage from forming station 3 and transferring it to welding unit 5, a slightly more sophisticated transfer unit is disclosed in FIG. 21. This comprises a take-off boom assembly 250 and an ingress conveyor 260. Take-off boom assembly 250 includes a tubular boom 251 which extends out over forming station 3 in the same manner as would boom 90. Thus referring to FIG. 21, the forming means 3 would be positioned between boom tower 253 and ingress conveyor 260. Boom 251 is rigidly secured to and extends from a motor unit 254. Motor unit 254 drives a conveyor chain 252 which extends through the interior of boom 251 and over the top thereof such that a cage can be conveyed along the length of boom 251. Motor unit 254 is mounted to travel vertically on a boom tower 253. An elevator chain 255 is secured to motor unit 254, passes up over pulleys at the top of tower 253 and down to a cylinder 256 to which it is secured. Activation of cylinder 256 thus changes the relative elevation of boom motor 254 and boom 252 as is indicated by the phantom lines for boom 251. As a conveyor is formed over boom 251, it is elevated so as to engage the cage and lift it off top pinch roller 33. Motion in conveyor chain 252 is then initiated to drive the cage off the end of boom 251 and onto ingress conveyor 260.

Ingress conveyor 260 includes a pair of top side rails 262 mounted to a frame 261. These act to support a formed cage on the conveyor. A kick plate 263 is slidably mounted on a pair of tracks 264 and can be moved forwardly or rearwardly by a drive chain 265. As kick plate 263 is moved forwardly, it engages the rear end of a formed cage and drives it down ingress conveyor 260 towards welding unit 5.

OPERATION

CAGE FORMING

The first step in forming cages is loading a roll of fabric 16 into storage crib 1. Bumper roller 19 is provided for facilitating this operation by causing the roll to align properly as it rolls over it and into place. Once in place, the new roll rests on crib rollers 20, 22 and 23 (see FIG. 4). The next step is feeding fabric from the new roll into the first set of pinch rollers 26 and 27. One can initiate a rotational motion in fabric roll 16 by turning hand wheel 21 on crib roller 20. The fabric begin to roll and the free end naturally tends to unwind. As it does so, it passes beneath take-off roller 25 which prevents it from bending back upwardly towards the rest of the roll. One continues rotating hand wheel 21 until the fabric engages driven pinch rollers 26 and 27.

At this point, pinch rollers 26 and 27 begin pulling the fabric from roll 16 and feeding it through shearing station 2. As longitudinal wires 17 pass between pinch rollers 26 and 27, pinch roller 27 expands downwardly against spring 28 in order to facilitate this passage. Tension on chain 63 is maintained by spring 68b acting on lever 68a to thereby force gear 68 to the right, as viewed in FIG. 8. A driven flattening roller 29 tends to flatten the fabric and also insures that it will pass beneath shearing station 2 rather than into it.

The fabric then passes beneath shear 2 and over a driven guide roller 31 which acts to guide the fabric into the second set of pinch rollers 33 and 34. At this point, receiving pan 37 is in its elevated position as shown in phantom in FIG. 4 so as to not interfere with the feeding of fabric into pinch rollers 33 and 34. The first set of pinch rollers 26 and 27 and the second set of pinch rollers 33 and 34 are sufficiently close together that fabric will pass from the first set 26 and 27 into engagement with the second set 33 and 34 before it is necessary to cut the fabric to the desired length.

As longitudinals 17 pass between pinch rollers 33 and 34, pinch roller 34 expands downwardly against biased spring 35. Additionally, idler gear 75 springs downwardly through the action of spring 79 (FIG. 8) and idler gear 70 springs downwardly through the action of coiled spring 73. In this manner, proper tension is maintained on drive chain 67.

As fabric passes between pinch rollers 33 and 34, it engages forming roller 36 which bends the cage upwardly over pinch roller 33 in the manner indicated by the arrows in FIG. 4. In the meantime, measuring means 45 is measuring the length of fabric which is passing shear 2. When a desired length of fabric has passed for forming a given cage, drive motors 61 are stopped (FIG. 8) and shear 2 is activated to cut the fabric. Once the fabric has been cut, motors 61 are again activated, but, clutch 66 is disengaged such that rear drive chain 63 is deactivated. In the meantime, receiving pan 37 is lowered in order to allow the fabric to pass through the greatest arc possible before it engages receiving pan 37 (FIG. 4). Once the completely formed cage is removed from top pinch roller 33, in a manner to be subsequently described, clutch 66 is re-engaged and drive chain 63 again begins to drive pinch rollers 26 and 27 in order to bring more fabric beneath shear 2.

The measuring apparatus 45 is set such that the fabric is sheared closely adjacent a longitudinal wire as can be seen by reference to FIGS. 2 and 3. However, the longitudinal wire must not be cut or split during the cutting operation. This results in one end of each circumferential wire being firmly held down by a longitudinal and thereby makes it easier for the welder-collaborator 170 to align and hold the juxtaposed ends together while they are being welded. Additionally, the American Society For Testing, And Materials, C76–68 Specification, specifies that for given cage diameters, there must be a certain amount of overhang, i.e., a certain length of overlapping circumferential wire extending beyond the first longitudinal 17. A minimum of 2 inches is required where the wires are welded. This "overhang" is indicated by the letter O in FIG. 3. If a minimum of 2 inch overhang is required and the spacing between adjacent longitudinals is 4 inches, then it is evident that if the cut were made 2 inches from each longitudinal, it would be difficult to obtain a proper amount of overhang.

In order to change the diameter of the cage being formed, one merely changes the setting on measuring means 45 and changes the relative position of forming roller 36. This latter operation is performed by rotating ratchet lever 53 thereby causing chain 44 to travel and rotate adjusting nuts 42 (FIG. 6). This threads posts 41 either upwardly or downwardly and thereby varies the height of forming roller 36 (FIG. 5).

As the position of forming roller 36 is altered, its drive gear 36a will also move either upwardly or downwardly. In order to maintain proper tension on guide chain 67, the position of idler gear 70 is automatically adjusted in response to rotation of ratchet 53 (FIG. 8). Assuming forming roller 36 is moved downwardly, bracket 74 which is operably connected to threaded post 41 is also moved downwardly thereby pivoting lever 72 about its central pivotal mounting. This moves lever 71 and idler gear 70 which is mounted thereto upwardly. Thus, the downward movement of drive gear 36a is offset by the upward movement of idler gear 70.

Cage Transfer

Once a cage is formed over top pinch roller 33, it is ready for transfer to welding station 5. The operator of the apparatus stands adjacent control assembly 6 and calls for a cage by activating an appropriate control. This activates motor 93 on tower 91, thus elevating the free end of boom 90 (FIG. 1). The formed cage slides down boom 90 and boom 90 then settles back into its original position leaving the formed cage resting on roller pipes 94. Because support 120a is normally disengaged from boom 90, it will not be in the way of the cage. By rolling, pipes 94 make it easy for the operator to rotate the cage until the juxtaposed ends of the circumferentials are positioned on top of beam 110. The operator then uses a small slotted gauge clamp to clamp together in spaced or guaged relation the two top adjacent longitudinals 17a and 17b (FIGS. 2 and 3). The clamp is applied near the rear end of the cage, i.e., the end towards forming station 3 and away from welding station 5. This holds the longitudinals 17a and 17b a given distance apart. The cage is now ready for conveyance past welder-collaborator 170.

Cage Conveyance

The operator now initiates cage conveyance by manually raising lever 162 of gate switch 160a (FIGS. 9 and 11). This causes support 120b to pivot downwardly in order to allow the cage to be passed into engagement with conveyors 130, 111 and 155. It also causes the first stabilizer bar 118 to move upwardly out of engagement with beam 110. From this point, the operation is entirely automatic. As the cage is passed into engagement with these conveyors, it is funneled through funnel flanges 95 which aid the gauging block in holding the cage in proper alignment. Once conveyance has begun, the operator removes the gauge block which he had previously placed on the rear end thereof.

As the cage is conveyed, the top longitudinals 17a and 17b, and the juxtaposed ends of the circumferentials are sandwiched between the conveyor wheels 132a and beam conveyor belt 111. Conveyor wheels 132a rotate slightly faster than conveyor 111 travels in order to aid in holding the circumferentials in reasonable alignment. Friction between the bottom of the cage and side rails 96 on which it rests is minimized by the fact that the bottom of the cage is also being conveyed by conveyor 155.

As the cage is moved, it next engages and activates gate switch 160b (FIG. 11). This causes support 120a to move into engagement with support plate 113 of boom 90. Since the cage has now passed this point, there will be no interference between the engagement of support 120a and the cage. As lever 162 and its extention portion 165 of gate switch 160b is elevated, it engages the central portion of lever 162 on gate switch 160c (FIG. 11). Thus, gate switch 160c is activated even before the cage actually reaches its lever 162. The activation of gate switch 160c causes support 120c to disengage beam 110. The reason for using separate switches to engage support 120a and disengage support 120c is to insure that boom 90 will be supported before support 120c is disengaged. Boom 90 is such a long extension on the end of beam 110 that it could be dangerous to have the three front supports 120a through 120c disengaged simultaneously even if only for a fraction of a second. The use of the two separate switches 160b and 160c could be eliminated by the use of some sort of timing circuit. However, the mechanical expedient of using two separate switches has proven more economical.

As the cage is conveyed past support 120c, lever 162 of gate switch 160a is disengaged by the cage and is allowed to fall again. This causes support 120b and the first stabilizer bar 118 to re-engage beam 110. Then, the cage engages gate switch assembly 160d and causes support 120d to disengage beam 110. The second longitudinal stabilizer bar 118 is also disengaged from beam 110 by the activation of gate switch 160d. As the cage passes gate 120d, the levers 162 of gate switches 160b and 160c are sequentially disengaged causing support 120a to disengage from boom 90 leaving it free to transfer another cage from forming station 3 and causing support 120c to re-engage beam 110.

The cage then engages and activates gate switch 160e causing support 120e to disengage beam 110. Additionally, the third and final longitudinal stabilizer bar 118 is disengaged from beam 110 and simultaneously, clutch plate 143 (FIG. 14) is moved upwardly such that transfer gear 146 moves out of engagement with beam conveyor drive chain 147. Thus, beam conveyor 111 ceases motion. Also occurring in response to the activation of gate switch 160e is the acceleration of bottom conveyor 155 to a higher speed. This moves the now completely welded cage rapidly to the end of beam 110. As the cage disengages lever 162 of gate switch 160d, support 120d re-engages beam 110. As with the other gates, gate switch 160f is engaged and activated by the cage thus disengaging support 120f. Then, gate switch 160e is disengaged, causing support 120e and the third stabilizer bar 118 to re-engage beam 110 and causing transfer gear 146 to again engage drive 147 for beam conveyor 111. As the cage is ejected off the end of conveyor 155, it disengages lever 162 of gate switch 160f, thereby finally causing support 120f to re-engage beam 110.

As has been previously mentioned, supports 120a and 120b pivot rearwardly, in the direction of travel of a cage, when they engage boom 90 and beam 110 respectively. Contrawise, the remaining supports 120c through 120f pivot rearwardly, in the direction of travel of a cage, in order to disengage beam 110. The reason for this is that it is very important for supports 120a and 120b to engage boom 90 and beam 110 respectively as soon as possible after a cage has passed in order to give support for the front end of beam 110 which is made extremely heavy by the long boom 90 extending therefrom. If supports 120a and 120b pivoted forwardly to engage boom 90 and beam 110 respectively, the cage would have to travel approximately 11 inches farther before they could do so because otherwise, they would pivot upwardly and engage the rear end of the traveling cage.

On the other hand, once the cage is being conveyed along beam 110, it is far more important that the supports 120c through 120f get out of the way of an oncoming cage quickly. If they pivoted forwardly to disengage beam 110, they would tend to collide with an oncoming cage. By pivoting rearwardly, a cage can be practically on top of a support 120c through 120f before it has to be disengaged from beam 110.

WELDER-COLLABORATOR OPERATION

As the formed cage is being conveyed through welding apparatus 5, it is conveyed passed welder-collaborator 170 and the juxtaposed ends of the circumferential wires are welded thereby. As a pair of juxtaposed ends of a circumferential wire 18 travel past welder-collaborator 170, the lead wire engages sensing finger 176 (FIGS. 16 and 18). This causes sensing plate 175 to pivot about stud 187 (FIG. 16). As this occurs, trigger 202 is forced by spring 205 to pivot about stud 201 (hidden) from a position as shown in FIG. 18 to that shown in FIG. 19. This pulls the flanged head 203 of trigger 202 down into engagement with limit switch 206 (FIG. 15). The resulting activation of limit switch 206 activates a solenoid valve which changes the flow of fluid to hydraulic cylinder 208, thus driving piston rod 209 to the right as shown in FIG. 19. This causes driving flange 210 to drive drive plate 185 to the right as is indicated by the arrows in FIGS. 16 and 17. Since sensing plate 175 is limited to diagonal movement by slide plate 198 and by the action of spring 196, stud 187 causes sensing plate 175 to be elevated out of the path of the circumferential wires 18 by its interaction with diagonal slot 177 (see FIGS. 16 and 17). Similarly, holding fork 180 is limited to vertical movement by the interaction of studs 183 and slots 194 on front plate 191 (FIG. 18). Accordingly, it is driven directly downwardly by the movement of drive plate 185 because of the interaction of cam openings 186 with cams 182. The juxtaposed ends of a circumferential wire 18 are thus engaged and held together by the generally V-shaped opening formed by prongs 181.

Just as driving flange 210 and drive plate 185 are moved to the right by cylinder 208, so also trigger flange 211 is moved to the right. After moving a certain distance, contactor plate 212 on switching flange 211 engages limit switch 213. The activation of limit switch 213 initiates the welding cycle of welder gun 171. It should be noted that switch 213 is not activated until a short time after holding fork 180 has clamped the juxtaposed ends of circumferential wire 18 tightly together. Flux is melted onto the juxtaposed wires 18 and flows therebetween to form a weld. The welding apparatus includes a timing cycle for welder gun 171 and when this cycle has been completed, the aforementioned solenoid valve is de-energized. Accordingly, piston 209 of cylinder 208 is again driven to the left as seen in FIGS. 15 through 19 and holding fork 180 is pulled upwardly by the action of spring 195. Similarly, sensing plate 175 is forced back downwardly by the interaction of stud 187 and slot 177. It should be noted that spring 196 biases sensing plate 175 towards movement in a forward direction as well as in a downward direction. This insures that sensing finger 176 will slide past the wires which have already been welded and will not cause them to be re-welded when the above cycle in reinitiated.

During the entire time the juxtaposed wires 18 are being welded, the cage is traveling along beam 110. Accordingly, welder-collaborator 170 must also travel since it is tightly clamped through the action of holding fork 180 to the juxtaposed wires. This is accomplished by the fact that welder-collaborator 170 travels on rollers 225 along track 220 (FIG. 20). When a weld has been completed and the welded wires are disengaged by holding fork 180, welder-collaborator 170 is pulled towards the front of welding station 5 by the action of weight 232 (FIG. 20). It should be noted that cable 230 is connected to the rear welder-collaborator 170 and a roller 226 engaging the bottom of track 220 is provided to prevent welder-collaborator 170 from being lifted off track 220 by weight 232. As it moves forwardly, welder-collaborator 170 will sense and engage the next pair of unwelded ends of a circumferential wire as they move rearwardly along beam 110.

If the conveyors 130, 111 and 155 are moving at a proper speed, welder-collaborator 170 will alternately move rearwardly and forwardly through a short range along track 220 throughout the entire operational day of the apparatus. However, if the conveyors are moving a little too fast, it is possible that welder-collaborator 170 will eventually be moved towards the end of track 220. Accordingly, a stop limit switch 235 has been positioned along the path followed by weight 232. As weight 232 is pulled upwardly by the movement of welder-collaborator 170 to the rear of track 220, its collar 233 eventually engages stop limit switch 235. The activation of switch 235 automatically shuts down power to conveyors 130, 111 and 155. The cage no longer moves and welder-collaborator 170 merely moves forwardly under the influence of weight 232, sensing and welding juxtaposed circumferential wires as it does so, until weight 232 has dropped sufficiently low that its collar 233 engages a start limit switch 234. When this happens, the conveyors 130, 111, and 155 are again activated.

OPERATION OF ALTERNATE TRANSFER MEANS

The operation of the alternate transfer means shown in FIG. 21 is very similar in principle to the operation of boom 90. It too requires the positioning of a boom 251 closely adjacent to top pinch roller 33 such that as a cage is formed, it is formed in operable alignment with the boom such that activation thereof automatically initiates the removal and transfer operation without the requirement of positioning the boom in alignment prior to removal. As a cage is formed, it encircles boom 251 just as it would boom 90. When a cage has been completely formed and is called for by the operator, cylinder 256 is activated, pulling chain 255 downwardly and pulling motor unit 254 and boom 251 upwardly. This engages the formed cage and raises it above top pinch roller 33. Conveyor chain 252 is then automatically activated and fires the cage down the length of boom 251 off its end and onto ingress conveyor 260.

A motor on ingress conveyor 260 then causes chain 265 to drive plate 263 forwardly towards welding apparatus 5. Plate 263 engages the rear of the cage and transfers it towards welding apparatus 5 between the rails 262.

This transfer unit could readily be utilized even without welding assembly 5. Boom 251 could be placed over a forming unit in the manner described above and could be used for transferring cages to ingress conveyor 260. Then, a man standing adjacent welder-conveyor 260 could manually weld the cages as they were transferred to and past him on conveyor 260. A foot peddle could be associated with the motor driving chain 265 such that the speed of the conveyor could be varied in accordance with the operator's ability.

In utilizing this alternate transfer means in connection with welding apparatus 5, it should be noted that support 120a and gate switch 160b could be eliminated. Support 120a is the support for boom 90 and gate switch 160b is the switch for controlling the engagement of support 120a with boom 90. Upon elimination of gate switch 160b, one would have to move gate switch 160c slightly to the right in order for its lever 162 to be engaged by a moving cage prior to the time when it would reach support 120c.

CONCLUSION

Thus it can be seen that there are many aspects and features of this invention which comprise significant contributions to the art. With this apparatus, one man can replace four or five men in a conventional operation. Quality can be improved by insured uniformity. Fabric can be unrolled without attendant bending of the ends of longitudinal wires. Economies in equipment are effected by providing a single drive means for unrolling fabric and for forming it into cages. The use of either of the transfer means disclosed herein eliminates the necessity of positioning a conveying means above a formed cage prior to actually initiating the removal and transfer of the cage to a welding station. Finally, the automatic welding effected by this apparatus is rapid, efficient and uniform.

It is understood that the above is merely a preferred embodiment of this invention and that many alterations and changes can be made without departing from the spirit and broader aspects of the invention.

The embodiments of the invention in which an exclusive property or privilege is claimed are defined as follows.

1. An apparatus for producing welded wire fabric cages having circumferential wires comprising: means for forming wire fabric into a cage with the ends of the circumferential wires being juxtaposed; means for welding the juxtaposed ends of the circumferential wires of the cage; means for conveying said cage from said forming means past said welding means; said conveying means being positioned with respect to said forming means such that said cage is formed in operable alignment with said conveying means such that activation of said conveying means automatically engages said cage and conveys it; said welding means including means for sensing passing circumferential wires and initiating welding in response to said sensing whereby said cage is welded automatically as it passes said welding means.

2. The apparatus of claim 1 in which said conveying means comprises: a boom mounted adjacent said forming means such that cages enclose said boom as they are formed; means for elevating said boom such that it engages said cage and removes it from said forming means.

3. The apparatus of claim 2 in which said boom comprises a boom conveyor on said boom for conveying said cage along the length of said boom.

4. The apparatus of claim 3 in which said conveying means comprises: an ingress conveyor positioned near the end of said boom and at a lower elevation such that cages conveyed off the end of said boom are received by said ingress conveyor.

5. The apparatus of claim 2 which comprises: said boom being pivotally mounted at one end; means for elevating the other end of said boom to thereby lift a formed cage away from said forming means and allow it to slide down the length of said boom.

6. The apparatus of claim 1 in which said conveying means comprises: a beam for supporting said cage along the juxtaposed ends of the circumferentials with the formed cage enclosing said beam as it is conveyed; a plurality of supports engaging said beam to provide support therefor; means for disengaging each of said supports from said beam whereby said cage can be conveyed past a disengaged support.

7. The apparatus of claim 6 which comprises: means for sensing the position of said cage on said beam whereby a given support can be selectively disengaged from said beam as said cage approaches and can be re-engaged with said beam after said cage has passed.

8. The apparatus of claim 6 which comprises: means for changing the elevation of said welding means and said beam with respect to the said supports whereby the diameter of the cages being welded can be varied.

9. The apparatus of claim 1 in which said welding means is movable in the direction of travel of said conveying means and is biased toward movement in the opposite direction such that said welding means moves with said cage as a pair of wires are being welded but moves towards the next set of juxtaposed wires upon completion of the weld.

10. The apparatus of claim 9 in which said conveying means comprises: a first conveyor passing adjacent said welding means; an egress conveyor positioned below said beam and extending at least from the end of said first conveyor to the end of said beam; said first conveyor being sufficiently long that it conveys a cage completely past said welding means such that the cage is completely welded when in engagement with said first conveyor; said egress conveyor moving at a higher rate of speed than said first conveyor such that a completely welded cage is conveyed rapidly to the end of said beam.

11. The apparatus of claim 9 in which said welding means comprises: a welder; means for sensing the presence of wire adjacent said welder; means for holding a pair of juxtaposed wires together adjacent said welder being movable into engagement with the juxtaposed wires in response to the sensing of wire by said sensing means; means for activating said welder following the engagement of said juxtaposed wire by said holding means; said holding means being movable out of engagement with said juxtaposed wires following completion of welding.

12. The apparatus of claim 1 comprising: means for storing wire fabric to be formed; means for shearing wire fabric; means for transferring wire fabric past said shearing means to said forming means.

13. The apparatus of claim 12 which includes means for indicating the length of fabric moved past said shearing means; means for activating said shearing means in response to an indication by said indicating means that a given length of fabric has passed said shearing means.

14. The apparatus of claim 1 in which said forming means comprises: a fabric roll storage crib including a pair of driven pinch rollers for extracting fabric from a roll stored on said crib and feeding it to a shearing means; shearing means adjacent said storage crib through which said fabric is fed; forming means adjacent said shearing means including a second set of driven pinch rollers which receive fabric from said first set and feed it into an adjacent forming roller; said first and second sets of pinch rollers being on opposite sides of said shearing means and being sufficiently close together that said fabric is received by said second set of pinch rollers prior to shearing of said fabric by said shearing means; a first drive means for driving said first pinch rollers and a second drive means for driving said second pinch rollers; a drive source for driving said first and second drive means; clutch means between said drive source and said first drive means whereby they can be disengaged at the time of shearing said fabric and re-engaged following forming of a cage.

15. The apparatus of claim 1 in which said conveying means comprises: means for conveying said cage at one rate of speed as it passes said welding means and means for conveying said cage at a higher rate of speed once said cage has been welded.

16. An apparatus for automatically welding a wire fabric cage having a plurality of circumferential wires comprising: means mounted on a frame for welding the juxtaposed ends of circumferential wires; means for conveying a cage past said welding means; a beam for supporting said cage with the cage enclosing said beam as it is conveyed; a plurality of supports engaging said beam to provide support therefor; means for disengaging each of said supports from said beam whereby said cage can be moved past a disengaged support while the engaged supports support said beam.

17. The apparatus of claim 16 which comprises: means for sensing the position of said cage on said beam such that a given support can be selectively disengaged from said beam as said cage approaches and can be re-engaged with said beam after said cage has passed.

18. The apparatus of claim 17 in which said sensing means comprises: switch means associated with each of said supports for engaging it or disengaging it from said beam; said switch means being activated when said cage approaches said support and being de-activated when said cage passes said support.

19. The apparatus of claim 18 in which said switch means comprises: a pivotally mounted lever with its free end extending into the path of said moving cage and being biased towards that position; said lever being rotatable about its pivot by the movement of a cage into engagement therewith; a limit switch being operably associated with said lever for activation upon rotation of said lever.

20. The apparatus of claim 16 in which each of said supports comprises a pivotally mounted post having a forked top for embracing said beam to restrain it from lateral movement.

21. The apparatus of claim 20 in which said forked top portion includes a roller element at the base of said fork to engage the bottom of said beam and thereby minimize friction between said post and said beam during the process of engagement or disengagement.

22. The apparatus of claim 20 which comprises: a plurality of longitudinal stabilizers, each engaging a channel on said beam; said channel comprising fore and aft stops embracing said stabilizer whereby said beam is restrained against longitudinal movement; means for disengaging each of said stabilizers from said channel whereby said cage can be moved past a disengaged stabilizer.

23. The apparatus of claim 16 in which said conveying means comprises: means for conveying said cage at one rate of speed as it passes said welding means and means for conveying said cage at a higher rate of speed once said cage has been welded.

24. The apparatus of claim 16 in which said conveying means comprises: a first conveyor passing adjacent said welding means; an egress conveyor positioned below said beam and extending at least from the end of said first conveyor to the end of said beam; said first conveyor being sufficiently long that it conveys a cage completely past said welding means such that the cage is completely welded when in engagement with said first conveyor; said egress conveyor moving at a higher rate of speed than said first conveyor such that a completely welded cage is conveyed rapidly to the end of said beam.

25. The apparatus of claim 24 which comprises: said first conveyor being mounted on said beam; drive means for driving said first conveyor located on said beam at the end of said first conveyor on the egress side of said welding means; a drive source for said drive means mounted on said frame; a clutch between said drive source and said drive means which can be disengaged from said drive means to facilitate passage of said cage.

26. The apparatus of claim 16 which comprises: means for changing the elevation of said welding means and said beam with respect to said supports whereby the diameter of cages being welded can be varied.

27. The apparatus of claim 26 in which said means for elevating said beam comprises: said beam including support plates secured thereto which are engaged by said supports to support said beam; the elevation of said support plates with respect to said beam being adjustable.

28. An apparatus for automatically welding a wire fabric cage having circumferential wires comprising: means for welding the juxtaposed ends of the circumferential wires; means for conveying the cage past said welding means; said means for welding being movable in the direction of travel of said conveying means and being biased towards movement in the opposite direction such that said welding means moves with said cage as a pair of wires are being welded but moves towards the next set of unwelded juxtaposed wires upon completion of the weld.

29. The apparatus of claim 28 which comprises: means for engaging said welding means with said moving cage as a pair of wires are being welded.

30. An apparatus for automatically welding a wire fabric cage having circumferential wires comprising: means for welding the juxtaposed ends of the circumferential wires; means for conveying the cage; means for conveying said welding means in the direction of travel of said cage and at the same speed whereby said cage is welded as it is conveyed.

31. The apparatus of claim 28 in which said conveying means comprises: means for conveying said cage at one rate of speed as it passes said welding means and means for conveying said cage at a higher rate of speed once said cage has been welded.

32. The apparatus of claim 28 in which said welding means comprises: means being movable into engagement with a pair of juxtaposed wires to be welded for holding the juxtaposed wires together as they are welded; means for activating said welding means following the engagement of said juxtaposed wires by said holding means; said holding means being movable out of engagement with said juxtaposed wires following completion of welding.

33. The apparatus of claim 32 which comprises: a beam for supporting said cage along the juxtaposed ends of the circumferential wires with the cage enclosing said beam as it is conveyed; a plurality of supports engaging said beam to provide support therefor; means for disengaging each of said supports from said beams whereby said cage can be moved past a disengaged support.

34. The apparatus of claim 33 in which said conveying means comprises: a first conveyor mounted on said beam; a second conveyor mounted in alignment with said first conveyor and in juxtaposition with said welding means so that both convey a cage along the same path past said welding means; said first and second conveyors moving at different speeds in order to force said juxtaposed wires sufficiently close together that they can be engaged by said holding means when they are to be welded.

35. The apparatus of claim 34 in which said first and second conveyors are driven by a common drive source; drive means for driving said first conveyor being located on said beam at the end of said first conveyor on the egress side of said welding means; a clutch between said drive source and said drive means which can be disengaged from said drive means to facilitate passage of said cage.

36. The apparatus of claim 35 in which said clutch comprises: first and second gears on a common axle being rotatably mounted on a mounting; said first gear being driven by said drive source; said second gear engaging said drive means; means for moving said mounting such that said second gear is moved out of engagement with said drive means and is moved out of the path of a cage being conveyed.

37. The apparatus of claim 34 in which said second conveyor comprises: a plurality of wheels having teeth for engaging said juxtaposed ends and pulling them along; said first conveyor comprising a continuous belt moving said cage more slowly than said second conveyor.

38. The apparatus of claim 34 which comprises: means for changing the elevation of said second conveyor and said welding means with respect to said supports for said beam and means for elevating said beam with respect to said supports whereby the diameter of cages being welded can be varied.

39. The apparatus of claim 28 which comprises: means for stopping said conveying means being operably associated with said welding means and being activated thereby when said welding means travels a predetermined distance along the path of said conveying means; means for starting said conveyor being operably associated with said welding means and being activated thereby after said welding means has traveled a predetermined distance in the direction opposite that traveled by said conveying means.

40. The apparatus of claim 39 which comprises: a track being mounted parallel to the path traveled by said conveying means; said welding means being movable along said track.

41. The apparatus of claim 40 in which said welding means is biased towards movement in the direction opposite that traveled by said conveying means by being operably connected to a weight; said stop and start means comprising switches positioned adjacent the vertical path followed by said weight with said stop switch being positioned above said weight and said start switch being positioned below said weight; both said switches being engageable by said weight as it moves along said vertical path.

42. The apparatus of claim 28 in which said welding means comprises: means for sensing the presence of wire adjacent said welding means; means for holding the juxtaposed ends of circumferential wires together being movable into engagement with the juxtaposed wires in response to sensing of wire by said sensing means; means for activating said welding means following the engagement of said juxtaposed wires by said holding means; said holding means being movable out of engagement with said juxtaposed wires following completion of said welding.

43. An apparatus for conveying a formed wire fabric cage from a means for forming the cage to a means for welding the cage comprising: a boom mounted adjacent said forming means such that cages being formed thereon enclose said boom as they are formed; means for elevating said boom to thereby lift a formed cage away from said forming means for subsequent conveyance along the length of said boom.

44. The apparatus of claim 43 which comprises: conveying means on said boom for conveying said cage along the length of said boom and off the end thereof.

45. The apparatus of claim 44 which comprises: an ingress conveyor positioned near the end of said boom at a lower elevation such that cages conveyed off the end of said boom are received by said ingress conveyor and are conveyed to a welding station.

46. The apparatus of claim 45 in which said ingress conveyor comprises rails on either side thereof to support said cage and prevent it from falling off said conveyor.

47. The apparatus of claim 46 in which said ingress conveyor comprises: a plate slidably mounted on a track; means for moving said plate along said track in order to convey cages which are engaged by said plate.

48. The apparatus of claim 44 in which said means for elevating said boom comprises: said boom being slidably mounted at one end on a vertical track in such a manner that it maintains a generally perpendicular relationship with respect thereto; means associated with said track for moving said boom along said track.

49. The apparatus of claim 43 in which said boom is pivotally mounted at one end at said welding station; said elevating means comprising means for elevating the other end of said boom to thereby lift a formed cage away from said forming means and allow it to slide down said boom to said welding station.

50. The apparatus of claim 49 in which said elevating means comprises a tower; an elongate flexible member being secured to the free end of said boom and passing over pulley means positioned at the top of said tower and being connected to a means on said tower for pulling on said flexible elongate member to thereby raise the free end of said boom.

51. A method of forming and welding a wire fabric cage comprising: bending wire fabric over a boom to form a cage substantially enclosing said boom; elevating said boom; moving said cage down said boom to a welding station; and welding the juxtaposed ends of the circumferential wires of the cage.

52. The method of claim 51 in which said welding step comprises moving said cage past a welding means; moving said welding means in the direction of travel of said cage as a pair of juxtaposed ends are welded; moving said welding means in the opposite direction following completion of said weld until said welder is positioned above the next set of unwelded juxtaposed ends.

53. The method of claim 52 which comprises: moving said cage at one rate of speed past said welding means and moving said cage at a higher rate of speed after said cage has been welded.

54. A method for automatically welding a wire fabric cage comprising: placing said cage around a beam with the juxtaposed ends of the circumferential wires of the cage resting on the top of said beam; positioning a welding means adjacent the top of said beam; moving said cage along said beam past said welding means; supporting said beam at a plurality of points and removing support at a given point as the cage is moved past that point.

55. A method of forming and welding a wire fabric cage wherein said method comprises: moving said cage past a welding means; moving said welding means in the direction of travel of said cage as a pair of juxtaposed ends are welded; moving said welding means in the opposite direction following completion of said weld until said welder is positioned above the next set of unwelded juxtaposed ends.

56. The method of claim 55 which comprises: holding a pair of juxtaposed ends closely together as they are being welded and releasing them once the welding has been completed.

* * * * *